United States Patent [19]

Firey

[11] Patent Number: 4,530,705
[45] Date of Patent: Jul. 23, 1985

[54] CYCLIC GAS SEPARATOR

[76] Inventor: Joseph C. Firey, P.O. Box 15514, Seattle, Wash. 98115

[21] Appl. No.: 600,841

[22] Filed: Apr. 16, 1984

[51] Int. Cl.³ .............................................. B01D 53/04
[52] U.S. Cl. ...................................... 55/162; 55/179; 55/208; 55/387
[58] Field of Search .................. 55/18, 20, 21, 23, 25, 55/26, 58, 74, 75, 161–163, 179, 180, 208, 387, 389

[56] References Cited

U.S. PATENT DOCUMENTS

| | | | |
|---|---|---|---|
| 1,661,149 | 2/1928 | Barnebey | 55/58 |
| 3,037,338 | 6/1962 | Thomas | 55/58 |
| 3,121,625 | 2/1964 | Broughton | 55/58 |
| 3,155,468 | 11/1964 | de Montgareuil et al. | 55/25 |
| 3,164,454 | 1/1965 | Wilson | 55/58 X |
| 3,552,096 | 1/1971 | Dayson | 55/163 |
| 3,619,984 | 11/1971 | Domine et al. | 55/25 |
| 3,720,042 | 3/1973 | Simonet | 55/25 |
| 3,850,592 | 11/1974 | Huffman | 55/208 X |
| 3,989,478 | 11/1976 | Jones | 55/23 X |
| 4,013,429 | 3/1977 | Sircar et al. | 55/58 X |
| 4,021,210 | 5/1977 | Streich et al. | 55/26 |
| 4,070,164 | 1/1978 | Miwa et al. | 55/26 |
| 4,126,000 | 11/1978 | Funk | 55/23 X |
| 4,169,715 | 10/1979 | Eriksson | 55/161 |
| 4,265,088 | 5/1981 | Funk | 55/23 X |
| 4,280,824 | 7/1981 | Lassmann et al. | 55/58 X |
| 4,285,917 | 8/1981 | Knight | 55/23 X |
| 4,354,859 | 10/1982 | Keller, II et al. | 55/25 |

Primary Examiner—Robert Spitzer

[57] ABSTRACT

A cyclic gas separator machine is described which can continuously separate a mixed gas into two or more differing and undiluted product gases differing as to the kinds of molecules present. Separation is accomplished by the action of a surface force material in retarding the flow of capturable molecules across its surface relative to uncapturable molecules. The needed cross flow is achieved by alternately compressing and expanding each container pressure vessel.

12 Claims, 16 Drawing Figures

CYCLIC GAS SEPARATOR

CROSS REFERENCES TO RELATED APPLICATIONS

The cyclic gas separator machine described herein is similar to machines described in my U.S. patent applications listed below but differs from them in using different containers and other elements in order to accomplish different beneficial results:
(1) "Cyclic Solid Gas Reactor," Ser. No. 06/473,566, filing date Mar. 9, 1983
(2) "Improved Cyclic Char Gasifier," Ser. No. 06/492,484, filing date May, 6, 1983
(3) "Cyclic Velox Boiler," Ser. No. 06/546,093, filing date Oct. 27, 1983, now standing allowed with the base issue fee paid now issued as U.S. Pat. No. 4,455,837 as of June 26, 1984.
(4) "Additionally Improved Cyclic Char Gasifier," Ser. No. 06/552,398, filing date Nov. 16, 1983, now U.S. Pat. No. 4,509,957.

BACKGROUND OF THE INVENTION

1. Field of the Invention

This invention is in the field of gas separators which utilize a surface force material across which a mixed gas flows in order to be separated into two or more differing product gases. Also, this invention is among those gas separators of this type which utilize cyclic flow of gases during the separation process.

2. Description of the Prior Art

It has long been known that a mixed gas can be at least partially separated by causing the mixed gas to flow across the surface of a material which exerts an attractive force upon the molecules of the mixed gas provided the force differs among at least some of the differing molecules of the mixed gas. The surface force material which exerts the force of attraction upon the gas molecules can be a solid or a liquid or mixtures thereof. The separating action appears to result from the fact that those molecules more strongly attracted to the surface are captured thereon for a time of delay and hence are left behind by the onward flow of those molecules not strongly attracted to the surface. As gas flow continues the surface approaches an equilibrium amount of molecules captured on the surface after which the separating action ceases. For this reason, prior art gas separators of this type have used intermittent flow or cyclic flow of the mixed gas across the surface in order to achieve useful separations. The surface is then at least partially purged of captured molecules between flow periods in order to restore the separating ability. The term chromatographic separator is sometimes applied to cyclic gas separators of this type due to their widespread use in gas chemical analysis.

Some examples of prior art cyclic gas separators using surface force materials and cross flow for separation are as follows:
a. Silica gel air dehumidifiers, which separate water vapor from air, use silica gel or other suitable surface force material. These usually have two separator chambers, one being in use while the other is being purged of water vapor by hot purge gas throughflow.
b. Gas purifiers and gas separators for chemicals preparation use surface force materials appropriate to the separation sought. Either two separator chambers are used, just as for air dehumidifiers, or the process is intermittent when but a single chamber is used. Again, some type of purge gas is used in removing those molecules held by surface forces.

The basic principles, suitable materials, and operating methods of prior art cyclic gas separators are described in several prior art references of which reference A is an example.

These prior art cyclic gas separators necessarily use a purge gas and a purge cycle to remove the molecules held by the surface force material in order to restore the separating capacity of the surface force material. Hence, these surface held molecules are only recovered intermittently and diluted into the purge gas. It would be advantageous to have available a cyclic gas separator which delivered the separated gas products continuously and in an undiluted form more suitable for subsequent use. Additionally, it would be advantageous to have available a cyclic gas separator which did not require a supply of purge gas for its operation. These prior art cyclic gas separators also deliver those molecules captured by the surface force material as a single and diluted gas product which is not separated further into additional differing gas products. Thus, it would be further advantageous to have available a cyclic gas separator capable of separating a mixed gas into two or three or more differing and undiluted gas products.

References:
A. "Gas Chromatography," H. Purnell, John Wiley, New York, 1962.

SUMMARY OF THE INVENTION

A cyclic gas separator machine of this invention compresses a mixed gas to be separated into one end of connected container pressure vessels where the mixed gas flows across the surface of a surface force material capable of capturing some of the types of molecules present in the mixed gas. Such capture retards the onward flow of the captured molecules relative to uncaptured molecules resulting in separation of these molecules. The container pressure vessel is next connected to be expanded from the other end of the container pressure vessel and additional capture combined with flow across the surface takes place resulting in continued separation of capturable molecules from uncapturable molecules. The first gas to emerge from the container pressure vessel outlet during expansion contains primarily uncapturable or weakly capturable molecules and these are directed by connection into a first product gas collector pipe via a first separate expander. The last gas to emerge from the container pressure vessel outlet during expansion contains primarily strongly capturable molecules and these are directed by connection into a final product gas collector pipe via a final separate expander. Where the mixed gas contains more than two types of molecules, intermediate gases emerge from the container pressure vessel outlet during intermediate portions of the expansion, and these will contain molecules moderately capturable and these can be directed by connection into an intermediate product gas collector pipe via an intermediate separate expander. To thusly change a container pressure vessel connection to the compressor, then to the first expander, then to the intermediate expanders if used, and then to the final expander, changeable container gas flow connections are used. These changeable connections can be opened and closed by a means for opening and closing controlled by a control means which repeatedly carries each container through this sequence of connections and provides that each compressor stage outlet always has one container connected and that each expander stage inlet always has one container connected. In this way, a cyclic gas separator machine of this invention continuously separates a mixed gas into two or more product gases which emerge continuously and undiluted. Separating capacity can be improved by cooling container pressure vessels during compression and by heating these pressure vessels during expansion.

Figure 1:
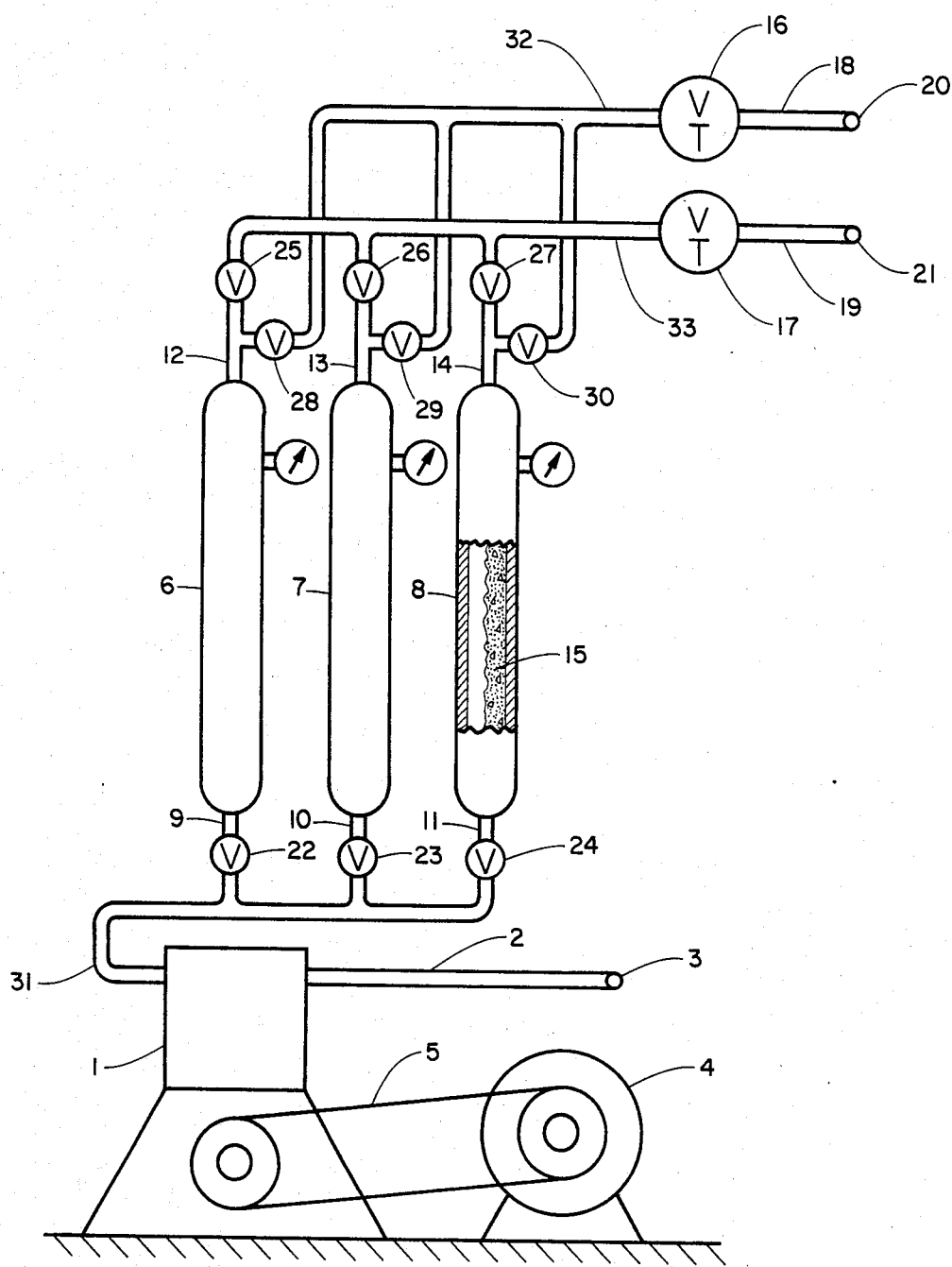
In FIG. 1 a simple cyclic gas separator machine is shown schematically.

DESCRIPTION OF THE PREFERRED EMBODIMENTS (A) Basic elements and operation:

One particular simplified example of a cyclic gas separator machine of this invention is shown schematically in FIG. 1 and comprises the following elements:

(1) a compressor means, 1, whose intake, 2, is connected to a source of mixed gas to be separated, 3;

(2) the compressor, 1, is driven by an electric motor power means, 4, via belts, 5;

(3) three container means, 6, 7, 8, which are elongated gas pressure vessels each with an inlet, 9, 10, 11, at one end and an outlet, 12, 13, 14, at the opposite end;

(4) a surface force material, 15, is positioned inside each of the pressure vessels, 6, 7, 8, so that as gas flows into the inlet, 9, 10, 11, or flows out of the outlet, 12, 13, 14, the flow is unidirectionally across the surface of the surface force material, 15;

(5) two separate expander means, 16, 17, whose discharges, 18, 19, respectively, connect separately to two product gas collector pipes, 20, 21, respectively, via expander discharge connection means;

(6) simple throttle valve expanders, 16, 17, are shown in FIG. 1 but expander engines can alternatively be used together with a power means for absorbing the work done by the engine;

(7) Changeable gas flow connections, 22, 23, 24, 25, 26, 27, 28, 29, 30, which are openable and closeable connect between the compressor, 1, outlet, 31, to each of the inlets, 9, 10, 11, of the containers, 6, 7, 8, and also connect between each of the outlets, 12, 13, 14, of the containers, 6, 7, 8, and the inlets, 32, 33, of the expanders, 16, 17;

(8) a container means for opening and closing these changeable gas flow connection 22, 23, 24, 25, 26, 27, 28, 29, 30, is needed together with a means for controlling this means for opening and closing and these are not shown on FIG. 1, but could well be a machine operator person who hand opened and closed the valves;

(9) in most cases the container means for opening and closing the changeable gas flow connections as well as the means for controlling the opening and closing means will be automatic devices and examples of such are described hereinafter;

(10) the compressor, 1, and the expanders, 16, 17, are all single stage in FIG. 1 so the number of containers, 6, 7, 8, equals the sum of the number of compressors and the number of expanders for this FIG. 1 example cyclic gas separator machine.

To separate the mixed gas supplied at the source, 3, into the two differing product gases delivered into the two separate product gas collector pipes, 20, 21, the cyclic gas separator machine of FIG. 1 operates as follows when running:

(1) During a first particular time period valves 22, 29, 27 are opened and valves, 23, 24, 25, 26, 28, 30 are closed and the compressor, 1, compresses mixed gas from the source, 3, into the pressure vessel of container, 6.

(2) As the mixed gas is compressed into the container, 6, the surface force material, 15, therein acts differentially upon the molecules of the mixed gas, some of which are held for long time periods by the surface force material at the inlet end. As a result, that portion of the mixed gas which is compressed deepest into the container, 6, toward the outlet end, 12, is depleted of those molecules strongly held by the surface force material. The mixed gas is thus separated into two differing portions by the combined effects of the surface forces and the cross flow of the gas during compression.

(3) The outlet, 13, of the container, 7, is opened to the expander, 16, and gas previously compressed therein now expands out of the pressure vessel, 7, through the expander, 16, and into the product gas collector pipe, 20. The gas first flowing out of the container, 7, after compression will be that portion of the mixed gas most highly depleted of those molecules strongly held by the surface forces. Hence, the gas first entering the product gas collector pipe, 20, will differ from the original mixed gas from the source, 3, in being depleted of molecules strongly attracted to the surface force material, 15.

(4) As expansion from container, 7, proceeds the pressure drops and undepleted gas originally at the inlet end of container, 7, now flows toward the outlet, 13, across the surface force material, 15, further on toward the outlet, 13, and is then similarly depleted of those molecules strongly attracted to the surface force material. Hence, the gas flowing into the product gas collector pipe, 20, continues, during a portion of the expansion, to be depleted of molecules strongly attracted to the surface force material, 15.

(5) Eventually, molecules strongly attracted to the surface force material will reach the outlet, 13, of the container, 7, during expansion since the molecules are not to be permanently held by the surface force material, 15. At this point, the container, 7, is to be closed to the expander, 16, and opened to the expander, 17, by closing the valve, 29, and opening the valve, 26, for container, 7. This ends this one particular time period between changes of gas flow connectings of the containers, 6, 7, 8, and all three containers are to change their gas flow connectings at the same time as will be described below.

(6) The outlet, 14, of the container, 8, is opened to the expander, 17, and gas previously compressed therein, and not already expanded thereout during the time period preceding this one particular time period, will now expand out of the pressure vessel, 8, through the expander, 17, and into the product gas collector pipe, 21. This is the gas last to flow out of a container during expansion and is richer in those molecules strongly attracted to the surface force material, 15, since these are now finally expanding out of the container, most of those molecules not thusly held strongly having already left the container. Hence, this gas last to leave a container also differs from the original mixed gas from the source, 3, in being richer in molecules strongly attracted to the surface material, 15, across which these gases have flowed unidirectionally during compression and expansion.

(7) Eventually, expansion of container, 8, is complete down to about the pressure of the product gas in the collector pipe, 21, and this also ends the one particular time period between changes of gas flow connectings under consideration. It is now time to start the next time period during which container, 8, will be recompressed, container, 7, will undergo final expansion through expander, 17, and container, 6, will commence initial expansion through expander, 16. During this next time period valves, 24, 26, 28 are opened and valves 22, 23, 25, 29, 27, 30, are closed.

(8) This next time period is, in turn, followed by another third time period during which container, 8, will commence initial expansion through expander, 16, container, 6, will undergo final expansion through expander, 17, and container, 7, will be recompressed. During this third time period valves, 23, 25, 30, will be opened and valves, 26, 29, 28, 27, 22, 24, will be closed.

(9) At the end of this third time period, the valves are opened and closed as described in item (1) above and the sequence of a cycle is ready to be repeated as already described.

(10) The time period between changes of container gas flow connections, tcc, will usually be the same for each of the several such time periods which constitute the cycle time interval, tc, though they can differ for successive time intervals. The cycle time interval, tc, is herein and in the claims defined as the sum of the several tcc time periods needed for any one container to go through a full cycle of compression and expansion. Thus, for the example cyclic gas separator of FIG. 1 the cycle time, tc, contains three time intervals between changes of container gas flow connectings, tcc.

(11) Note that during all time periods the compressor, 1, outlet, 31, always has an open gas flow connection to one container, either 6, or 7, or 8. Also during all time periods the expander, 16, inlet, 32, always has an open gas flow connection to one container, either 6, or 7, or 8. Also during all time periods the expander, 17, inlet, 33, always has an open gas flow connection to one container, either 6, or 7, or 8. Hence, the flow of mixed gas into the compressor, 1, and the flow of one product gas out of the expander, 16, and the flow of another product gas out of the expander, 17, are all continuous flows for this FIG. 1 type of cyclic gas separator of this invention.

(12) It is important that the gas flows essentially unidirectionally across the surface of the surface active material, 15, so that the best degree of separation is achieved between those weakly attracted gas molecules which first leave the container and those strongly attracted gas molecules which last leave the container. For example, if gas inflow during compression and gas outflow during expansion were to occur via the same container connecting pipe, say pipe, 11, of container, 8, then the separation achieved during compression inflow would be largely undone during the resulting backflow during expansion when remixing of the previously separated gases would occur. For this reason, the containers are fitted with a separate inlet and a separate outlet, and these are arranged so that gas flows essentially unidirectionally across the surface of the surface active material during compression and expansion.

(13) Slow remixing of the separated gases within a container is always in progress due to molecular diffusion along and against the unidirectional flow direction. For this reason, to suppress such diffusion remixing, we prefer the containers to be long in this unidirectional flow direction. Capture of gas molecules upon the surface force material is more rapid and hence separation is improved when the gas molecule diffusion path across the unidirectional flow direction is short so that molecules quickly reach the surface and frequently. For this reason, we prefer the containers to have a small cross section area across the unidirectional flow direction. We also prefer that the surface force material occupy a large portion of this cross section area so that the surface area to gas volume ratio within a container has a large value. The extent of molecule separation can be thusly increased, by reducing container cross section area, by increasing container length in the flow direction, and by increasing the surface to volume ratio but only up to the point where the resulting increased restriction to gas throughflow causes too great an increase of required compressor work input.

(14) The cyclic gas separator machine shown in FIG. 1 separates a mixed gas into two differing gas products. But the cyclic gas separator machines of the FIG. 1 type of this invention can also separate a mixed gas into three or more differing gas products by using additional separate expanders together with additional product gas collector pipes and additional containers. For example, by adding to FIG. 1 another separate expander discharging into another separate product gas collector pipe and adding one more container with similar changeable gas flow connections, the mixed gas from the source, 3, would be separable into three differing gas products.

(15) Hence, a cyclic gas separator machine of this invention can separate a mixed gas into two or more differing product gases and delivers these several product gases continuously and undiluted with any purge gas and these are some of the beneficial objects of this invention.

(B) Modified elements and added elements:

The simple cyclic gas separator machine of FIG. 1 is suitable for small plants separating small quantities of mixed gas. For larger plants separating larger quantities of mixed gas, this simple FIG. 1 type of machine suffers from the following disadvantages:

(1) The work input to the compressor, 1, from the power means, 4, varies widely, being very small when a container at lowest pressure is first starting to be compressed, and being very large when that same container is fully compressed and about to be disconnected from the compressor to start expansion.

(2) If expander engines are used, the work output from the expanders to their power means also varies widely, being very large when the containers at full pressure are first connected to the expanders, and being smaller when the fully expanded containers are about to change connections and are at their lowest pressure for the interval.

(3) These work variations take place during each time period between changes of container gas flow connections and, if the plant is large, will be difficult to accommodate. Use of multistage compressors and multistage expanders will reduce the magnitude of these work variations.

(4) If turbocompressors are used, the compressor efficiency will be low over some portion of the pressure range due to adverse blade to gas speed ratios.

(5) Hand operation of the changeable gas flow connections is awkward and an automatic means for opening and closing these valves and for controlling the time interval between changes of connectings will usually be preferred.

(6) The temperature of the surface material is essentially the same during both compression and expansion in FIG. 1 and thus is either too high for efficient capture of molecules during compression or too low for efficient removal of molecules during expansion. Capture of those molecules strongly attracted to the surface force material is increased when surface temperature is reduced and escape of captured molecules is increased when surface temperature is increased. Hence, we can improve the degree of separation by cooling those containers being compressed and heating those containers being expanded. Use of such a cooling and heating means may additionally decrease compressor work input and increase expander work output.

(7) For best plant output of separated gas products, we prefer to purge most of the captured molecules from the surface force material surface by the end of expansion and before starting compression again. Although total purging of those molecules strongly attracted by the surface forces is impractical, the extent of purging can be increased by increasing the temperature of the surface as described above and by decreasing the lowest pressure reached during expansion by use of a vacuum pump.

These several disadvantages of the simple FIG. 1 type of cyclic gas separator of this invention can be at least partially overcome in various ways by modifying some elements and by adding further elements.

Any of the several different kinds of compressors, such as piston compressors, roots blowers, centrifugal compressors, axial flow compressors, etc., can be used alone or in combination as the mixed gas compressor. Multistage compressors may be preferred in cases where a high cycle pressure compression ratio is used. The particular definition of a stage of a compressor or an expander is used herein and in the claims to be a portion of said compressor or expander which has a gas flow inlet and a gas flow outlet, both of which make connections external from the compressor or expander. For example, a single stage thusly defined could contain several piston and cylinder units acting to compress gas in series provided that all gas flow between such units went exclusively between units and not externally. When two or more compressor stages are connected in series with the delivery of a first stage connected to the supply of a second stage, whose delivery may in turn be connected to the supply of a third stage, the pressure at delivery necessarily rises from first stage to second stage to third stage and so on since each succeeding compressor stage receives at supply gas already raised to a higher pressure by the preceding stage. Hence, such later compressor stages connected in series are commonly and herein referred to as higher pressure stages.

Any suitable power means can be used alone or in combination to drive the compressor such as electric motors, steam turbines, or the expander engine of the cyclic gas separator plant itself. Either constant speed drive or variable speed drive of the compressor can be used.

Any of the several different kinds of expander engines, such as piston engines, radial flow turbines, axial flow turbines, etc. can be used alone or in combination as the product gas expander engine. A simple blowdown pipe can alternatively be used as a low-cost, non-engine expander but the available work of expansion is then lost so this type of expander is probably practical only when other work sources for driving the compressor are readily available and cheap. Multistage expanders may be preferred where a high cycle compression ratio is used so that high expander efficiency can be obtained by operating each stage over only that narrow range of pressures for which it was optimally designed. When two or more expander stages are connected in series, with the discharge of a first stage connected to the inlet of a second stage whose discharge may, in turn, be connected to the inlet of a third stage, the pressure at inlet necessarily decreases from first stage to second stage to third stage and so on since each succeeding expander stage receives at inlet gas already expanded to a lower pressure by the preceding stage. Hence, such later expander stages connected in series are commonly and herein referred to as lower pressure expander stages. Expander stages or groups of stages not thusly connected together in series are herein referred to as separate expanders. The work output of the expander engine can be absorbed by a power means in one or a combination of ways, as, for driving the mixed gas compressor or for driving an electric generator.

The largest fluctuation of net rate of work output occurs at each change of connectings. Just prior to the change all containers being compressed are near to full pressure for the interval and compressor work rate is maximum, whereas all containers being expanded are near to minimum pressures for the interval and expander work rate is minimum, the one expanding container about to disconnect from the expander producing essentially no work. Just after a change of connectings, all containers being compressed are at lowest pressures for the interval, the one container just connected to the lowest pressure stage of the compressor requiring essentially no work, whereas all containers being expanded are at maximum pressures for the interval and expander work rate is maximum. This largest work rate fluctuation can be approximated as equal to the sum of the maximum work rate of the lowest pressure stage of the compressor and the maximum work rate of the lowest pressure stage of the expander and clearly can be made as small as required by increasing the number of compressor stages, nc, and by increasing the number of expander stages, nx.

The total number of separate containers for a plant must at least equal the sum of the number of compressor stages plus the number of expander stages in order that each such stage always has a connection into a container. The connectings which the containers make to compressor discharges and to expander inlets change and such connectings are herein and in the claims referred to as container changeable gas flow connectings. Other gas flow connectings, as between stages of a compressor or an expander, are fixed and remain open whenever the plant is operating, and these are herein and in the claims referred to as fixed open gas flow connections. Changeable gas flow connections can be opened and closed while the plant is operating.

Although the opening and closing of the changeable gas flow connections can be carried out entirely by hand, as described for FIG. 1, it will usually be preferable to accomplish this control automatically.

A simple control scheme is to set a particular value of cycle time, tc, and time between changes of connectings, tcc, and then observe the actual maximum cycle pressures, PM, achieved during compression and then increase tc when PM is too low or decrease tc when PM is too high. This adjustment of tc in response to PM can be done by hand or automatically by methods already known in the art of controls. Other cycle time control methods can also be used as, for example, setting a particular value of PM and when this pressure is reached by each container in turn, a pressure sensor triggers the several valves to change connectings and start the next time interval in the sequence. Whatever cycle time control scheme is used, it functions by actuating the several valves and connections of the changeable gas flow connectings so that each container, in turn, is connected in sequence separately to each compressor stage in order of increasing pressure and then separately to each expander stage in order of decreasing pressure, and so that each compressor stage and each expander stage if always connected to a single container.

Any cooling means and heating means can in principle be used for cooling containers being compressed and for heating containers being expanded. Since any one container is alternately being cooled and then heated, fast-acting cooling and heating means are preferred such as evaporating liquids for cooling and condensing vapors for heating. For example, the pressure vessel of each container can be fitted with a jacket through which a cooling or heating fluid passes in direct contact with the outer side of the container pressure vessel. Condensing steam is a suitable heating means fluid and temperature can readily be controlled by controlling the pressure of the steam in the jacket. Evaporating water can be used as the cooling means fluid but very low pressures are necessary in the jacket if low temperatures are to be obtained. Liquid water can also be used as a cooling fluid but when heating is to commence, the jacket must first be emptied of the liquid water. A preferred combined cooling means and heating means is a vapor compression refrigerator system whose evaporator portion is the cooling means and whose condenser portion is the heating means. Changeable heating and cooling connections which can be opened and closed connect each container jacket to the cooling means and to the heating means. A means for opening and closing these changeable heating and cooling connections is controlled so that each container jacket is opened only to the cooling means while the container is being compressed and is opened only to the heating means while the container is being expanded. Use of these cooling and heating means improves the gas separating capability of a cyclic gas separator machine of this invention.

Additional gas cooling during compression can be obtained by using cooling jackets on the compressor, by using intercoolers between stages of multistage compressors, and by using aftercoolers between compressor outlets and container pressure vessel inlets. These additional compressor coolers also act to reduce the work input to the compressor, and to improve the gas separating capability.

One factor directly affecting the flow rate of mixed gas through the compressor means is the density of this mixed gas at compressor inlet and for some applications we may prefer to have a means for adjusting the mixed gas density at compressor inlet. Throttle valves can be used between the mixed gas source and the compressor inlet to reduce inlet gas density. Similarly, precompressors can be used between the mixed gas source and the compressor inlet to increase inlet gas density. Compressor inlet gas density can be adjusted, as by hand or automatically, in response to mixed gas throughput as sensed, for example, by maximum pressure of compression.

Another factor affecting the flow rate of mixed gas through the cyclic gas separator machine is the pressure and hence the gas quantity remaining inside each container pressure vessel after expansion is complete and compression is commencing. If too much gas is left inside after expansion, the flow rate is necessarily reduced. Hence, we prefer to control the flow rate through the expanders to assure that container pressure vessel pressure is brought down essentially to final product gas collector pipe pressure during the last time period, tcc, of expansion. This desired control of expander flow rate of product gases can be accomplished in one or a combination of several ways as, for example, by throttling the product gas pressure, by controlling nozzle flow area for blowdown expanders and for turbine expanders, by controlling cut-off timing for piston expanders. Throttling control, while mechanically simple, reduces the work output available from an expander engine. Various means of controlling nozzle flow area are already well known in the art of steam and gas turbines. Various means of controlling the timing of cut-off of flow of high pressure gas into the cylinder of a piston expander engine are already well known in the art of piston steam engines. One scheme for assuring that the desired minimum container pressures will be achieved within the cycle time interval is to actuate the product gas flow rate controller of the final expander in response to the minimum cycle pressure actually reached within the container means, expander flow rate being increased when minimum cycle pressure increases and being decreased when minimum cycle pressure decrease.

Similar expander flow rate controllers can also be used to assure that the molecule separation achieved inside each container is largely retained during expansion into the two or more product gas collector pipes. As a particular container pressure vessel undergoes expansion and pressure drop, the molecule composition of the gas leaving the container oulet, and hence entering the connected expander and product gas pipe, undergoes a series of changes since the original mixed gas has undergone separation within the container. Each such composition change occurs at a particular pressure, or within a narrow range of pressure, during expansion. When this composition change occurs, we want to switch the container from flowing into one product gas collector pipe via its connected expander to flowing into the next product gas collector pipe via its connected separate expander. Where each expander discharges into but one product gas collector pipe, this change of container gas flow connecting at outlet occurs necessarily at the end of a time interval, tcc, and all container gas flow connections are changed simultaneously including those other containers also undergoing expansion into other product gas collector pipes. Hence, during expansion we prefer to bring all containers undergoing expansion down to that pressure at which the next product gas composition change occurs or the final exhaust pressure is reached and all within the same single time interval, tcc. This preferred result can be obtained by fitting an expander flow rate controller to each expander and individually controlling the flow rates so that the desired pressures at which the next composition change occurs is reached by each expander within each time interval between changes of connections, tcc. For each mixed gas being separated and for each operating condition of the cyclic gas separator, there will be a particular set of these several change pressures of expansion at which composition changes occur and this change pressures set is best determined experimentally.

One example of a cyclic gas separator machine of this invention which comprises heating and cooling means, multistage compressors, expander flow rate control means and compressor inlet density adjustment means is shown schematically in FIGS. 2, 3, 4, 5, and comprises:

1. A multistage compressor, 34, comprising a low pressure stage, 35, whose inlet, 36, connects via a fixed open gas flow connection to the source of mixed gas, 37, and whose outlet, 38, delivers gas via a changeable gas flow connection, 46, to the inlet of that one container pressure vessel, 39, first undergoing compression after expansion and also delivers gas via an intercooler, 40, and a fixed open gas flow connection to the inlet of a high pressure stage, 41, whose outlet delivers gas via a changeable gas flow connection, 47, to the inlet of another separate container pressure vessel, 42, undergoing final compression.

2. A first separate expander, 43, is connected at inlet via a changeable gas flow connection, 48, to the outlet of that container pressure vessel, 44, first undergoing expansion after compression, and is connected at outlet via a fixed open gas flow connection to that product gas collector pipe, 45, receiving gas product depleted of those molecules strongly attracted to the surface force materials located inside each of the several container pressure vessels, 39, 42, 44, 49, 50.

3. A second separate expander, 51, is connected at inlet via a changeable gas flow connection, 52, to the outlet of that container pressure vessel, 49, undergoing expansion next after having been connected to the first separate expander, 43, and is connected at outlet via a fixed open gas flow connection to the intermediate separate product gas collector pipe, 53.

4. A third separate expander, 54, is connected at inlet via a changeable gas flow connection, 55, to the outlet of that container pressure vessel, 50, undergoing final expansion before starting again to be recompressed, and is connected at outlet via a fixed open gas flow connection to that separate product gas collector pipe, 56, receiving gas rich in those molecules strongly attracted to the surface force material inside each of the several container pressure vessels, 39, 42, 44, 49, 50.

Figure 2:
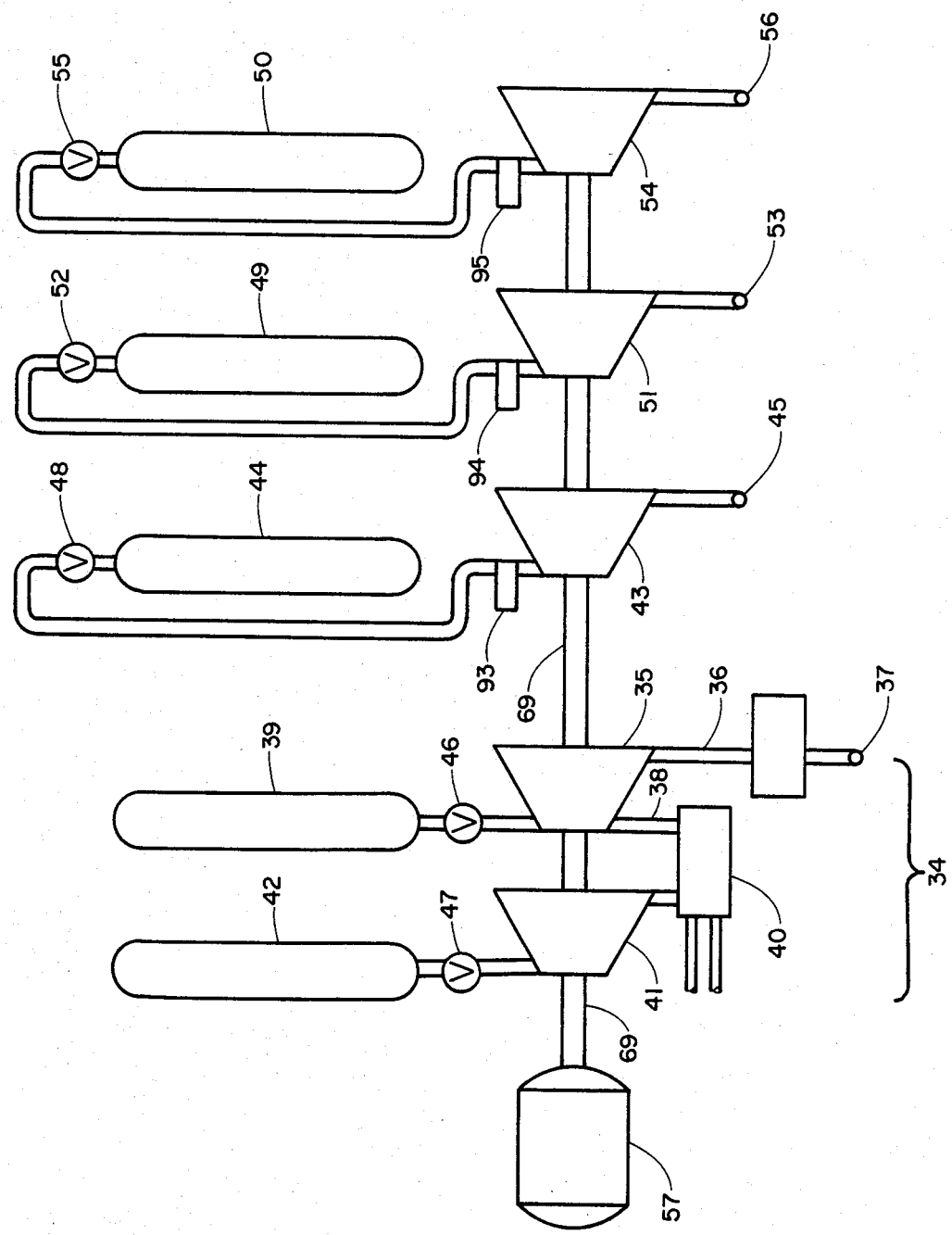
In FIGS. 2, 3, 4, and 5, a more complex cyclic gas separator machine which includes refrigerator cooling means and heating means for containers is shown schematically.
Figure 4:
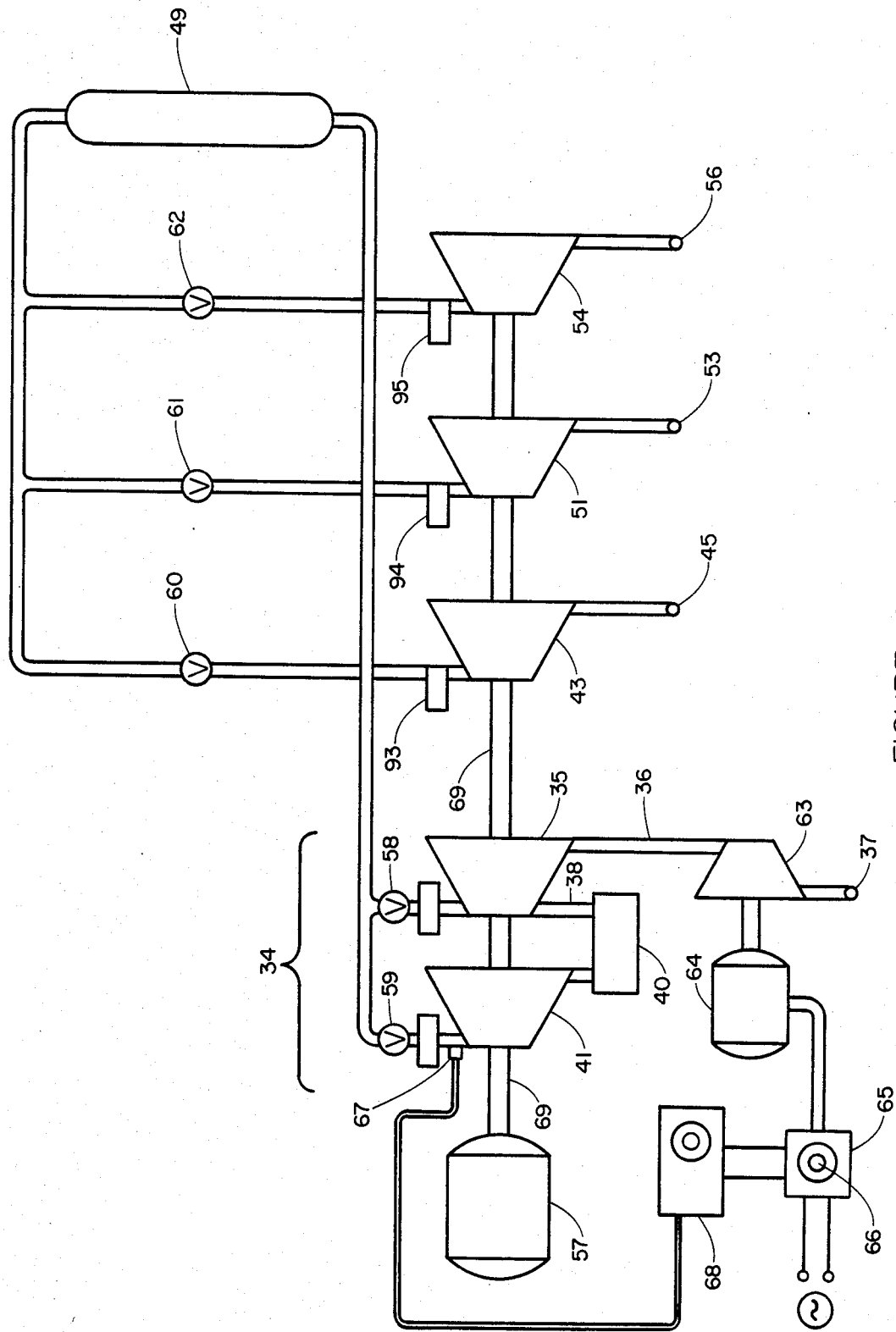

5. A power means, 57, provides the work necessary to drive the compressor stages, 35, 41, and also absorbs any work output of the separate expanders, 43, 51, 54, via the shaft, 69. A single combined power means is shown in FIGS. 2 and 4 but separate power means for compressors and expanders can also be used.

6. The changeable gas flow connections shown in FIG. 2 are only those in use and opened for one particular time interval between changes of connections, tcc, and several additional changeable gas flow connections exist. These are shown in FIG. 4 for but one of the containers, 49, but each of the containers, 39, 42, 44, 49, 50, has several changeable gas flow connections just like those shown in FIG. 4 for container, 49.

7. Each container, such as 49, has two changeable gas flow connections, 58, 59, from its inlet to each outlet of each stage, 35, 41, of the compressor, 34. The number of changeable gas flow connections to each container inlet thus equals the total number of compressor stages, (nc).

8. Each container, such as 49, has three changeable gas flow connections, 60, 61, 62, from its outlet to each inlet of each stage of each of the separate single stage expanders, 43, 51, 54. The number of changeable gas flow connections to each container outlet thus equals the total number of expander stages of all separate expanders, (nx).

9. The several fixed open gas flow connections remain open and fixed whenever the machine is operating.

10. One type of compressor inlet density adjustment means is shown in FIG. 4 and comprises a mixed gas precompressor, 63, compressing the mixed gas from the source, 37, into the inlet, 36, of the low pressure compressor stage, 35, and driven by a precompressor electric drive motor, 64, whose speed is adjustable via the speed adjustor, 65. The precompressor speed and hence the compressor inlet density can be adjusted by hand via the knob, 66, or automatically in response to, for example, final maximum compression pressure reached by each container pressure vessel during compression. This automatic adjustment of compressor inlet density can be accomplished in various ways as by using a maximum pressure sensor, 67, as input to a controller, 68, whose output adjusts the speed adjustor, 65; where compressor inlet density is to be less than the gas density in the source, 37, a throttle valve is an example of a suitable compressor inlet density adjustment means.

11. Each expander, 43, 51, 54, is fitted with an expander flow rate controller, 93, 94, 95, respectively, and these function to bring each connected container pressure vessel down to that change pressure at which the next product gas composition change occurs within each single time interval. Details of these expander flow rate controllers are described hereinafter.

Figure 6:
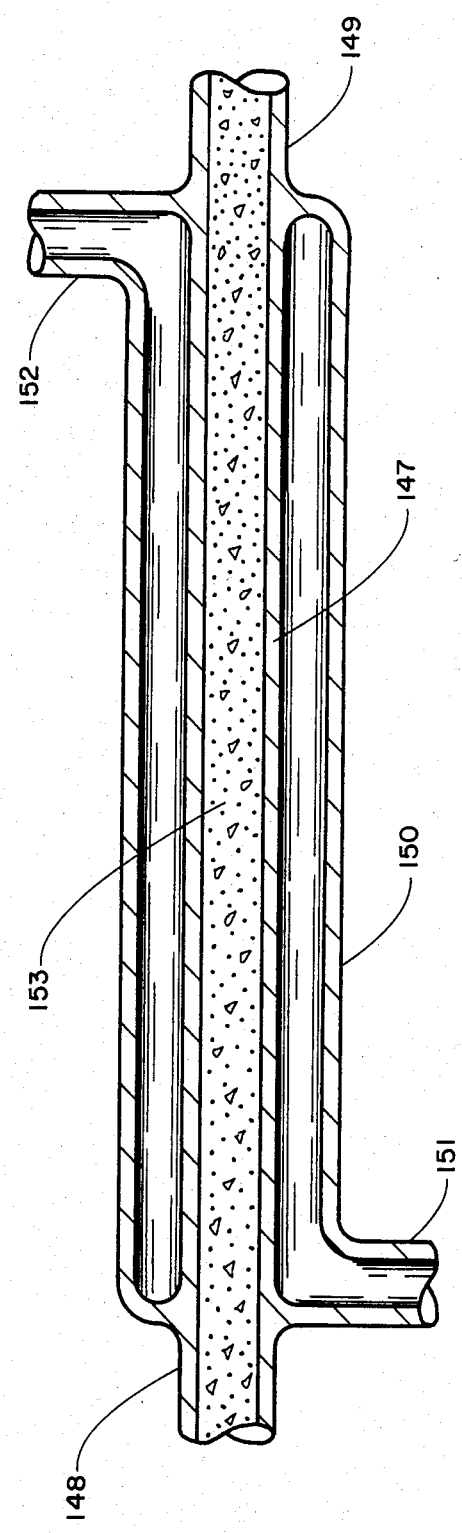
In FIG. 6 a double pipe type of container pressure vessel with heating and cooling jacket is shown in cross section.
Figure 7:
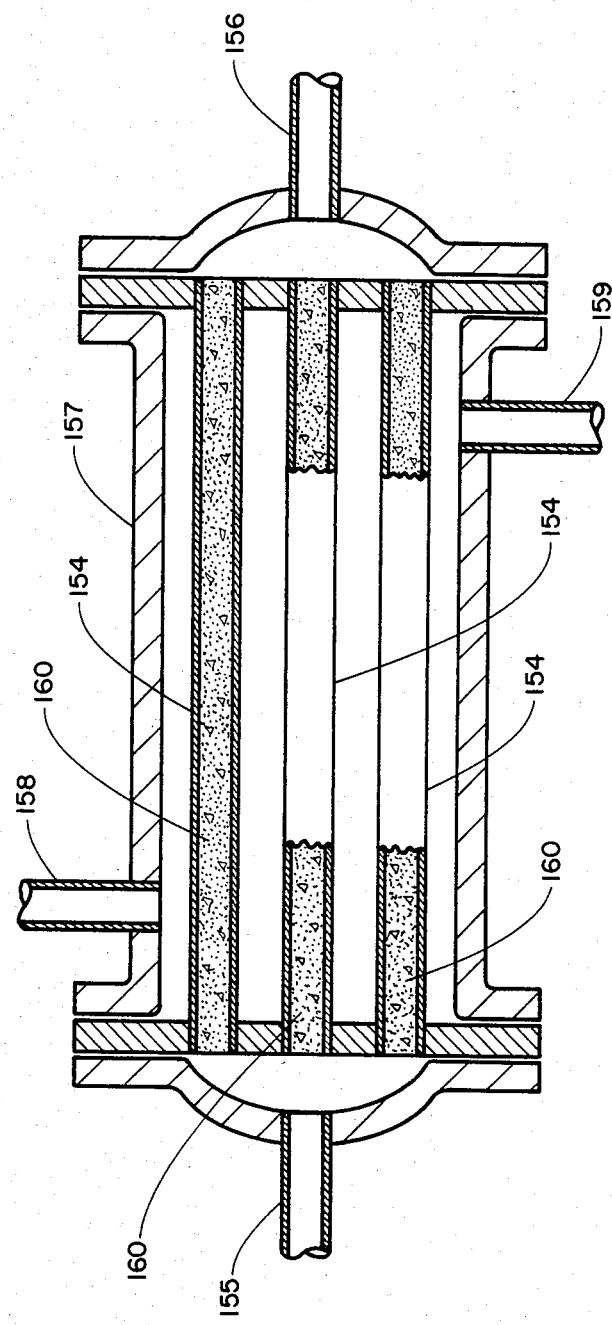
In FIG. 7 a shell and tube type of container pressure vessel with heating and cooling jacket is shown in cross section.

12. One type of combined heating and cooling means suitable for use on the cyclic gas separator machine shown in FIGS. 2 and 4 is shown schematically in FIGS. 3 and 5 and comprises a vapor compression refrigeration machine whose evaporator is the cooling means and whose condenser is the heating means. For such cooling and heating means, each container pressure vessel is surrounded with a jacket having an inlet and an outlet arranged so that fluid passing through the jackets contacts the outside of the pressure vessel but not the inside. These arrangements of a container pressure vessel and a container heating and cooling jacket are not shown in FIGS. 3 and 5 but are shown in FIGS. 6 and 7 and will be described hereinbelow. The example combined cooling and heating means of FIGS. 3 and 5 comprises:

(a) A refrigerant vapor compressor and drive means, 69, which compresses refrigerant vapor from a low pressure at its inlet, 70, to a high pressure at its outlet, 71.

(b) A back pressure regulator, 72, may be used at compressor inlet, 70, when it is desired to hold a constant pressure and hence temperature in those container jackets being cooled by refrigerant evaporation. This constant pressure and hence the cooling temperature can be adjusted by adjusting the regulator, 72.

(c) A liquid refrigerant receiver, 73, to catch condensed refrigerant from those container jackets being heated by condensing refrigerant.

(d) A thermostatic refrigerant expansion valve, 74, whose remote bulb, 75, is located where refrigerant is to be fully evaporated, may be used to assure full evaporation of liquid refrigerant in those container jackets being cooled.

Figure 3:
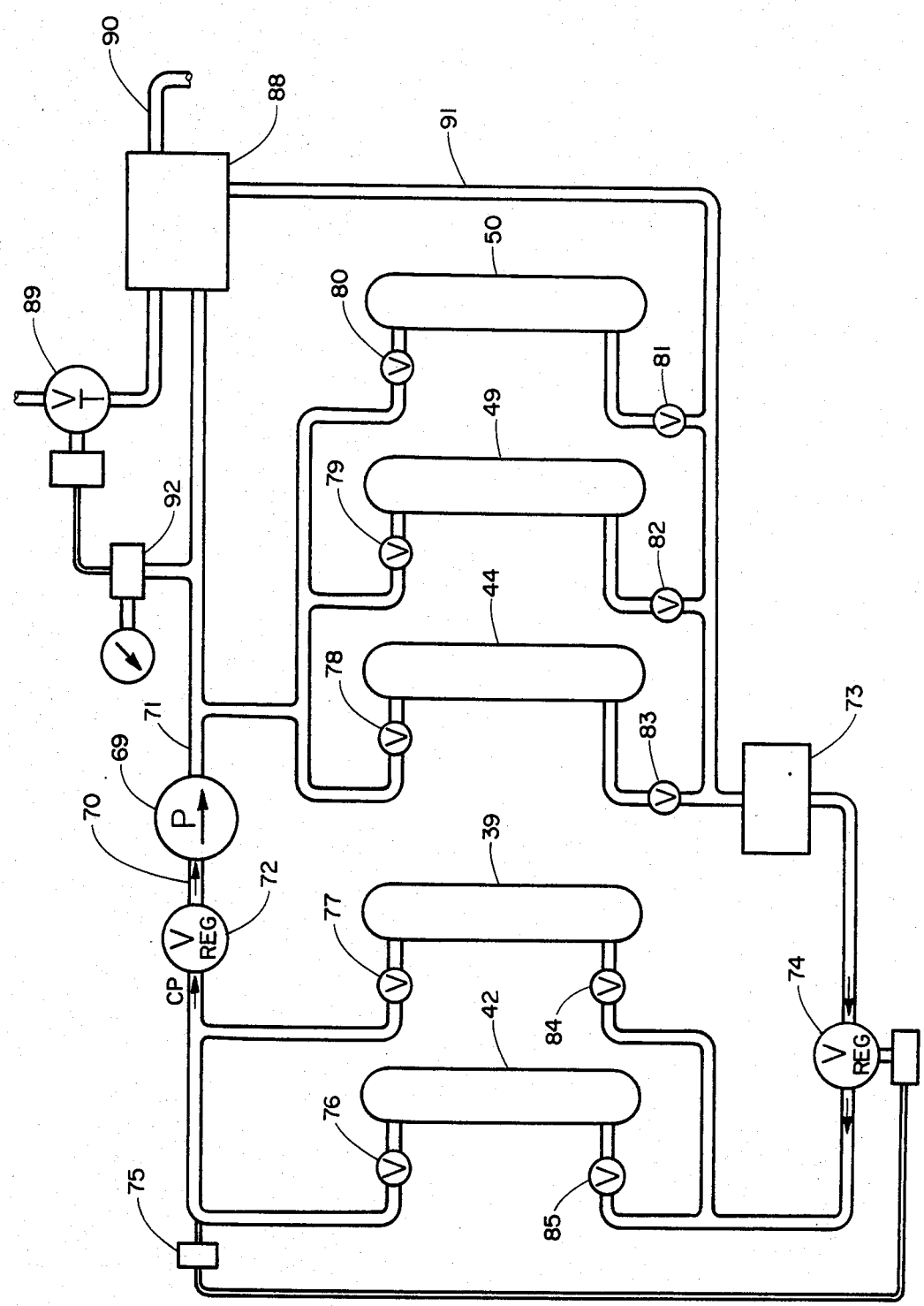

(e) Changeable heating and cooling connections which can be opened and closed, 76, 77, 78, 79, 80, 81, 82, 83, 84, 85, are provided: between the refrigerant compressor outlet, 71, and the heating inlet of each container jacket; between the heating outlet of each container jacket and the liquid refrigerant receiver, 73; between the refrigerant expansion valve, 74, and the cooling inlet of each container jacket; between the cooling outlet of each container jacket and the inlet, 70, of the compressor via the back pressure regulator, 72. For the five containers with jackets, 39, 42, 44, 49, 50, shown in FIG. 3, a total of twenty such changeable heating and cooling connections are required. But only ten of these are shown in FIG. 3 as being those changeable heating and cooling connections which are open and in use when these same containers are connected to compressors and expanders as shown in FIG. 2.

Figure 5:
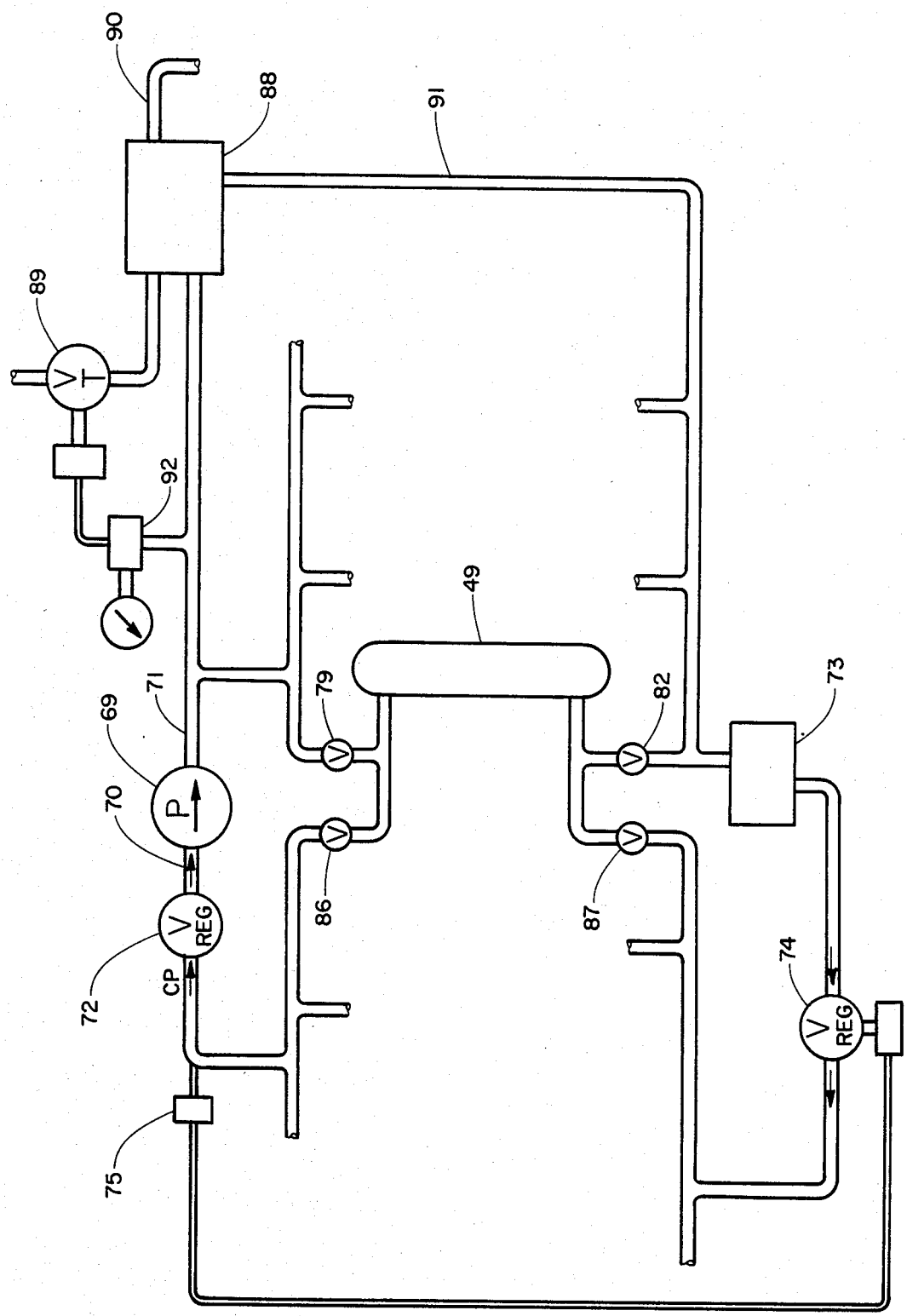

(f) All of the changeable heating and cooling connections, 79, 82, 86, 87, for but one, 49, of the container jackets are shown in FIG. 5, and each container jacket is similarly fitted. Note that with these changeable heating and cooling connections a container jacket can either connect between compressor outlet, 71, and liquid receiver, 73, when being heated, or can connect between expansion valve, 74, and compressor inlet, 70, when being cooled.

(g) An auxiliary refrigerant condenser, 88, may be used in some cases to assure full condensation to liquid of all refrigerant evaporated in container jackets being cooled. A condenser cooling fluid, such as water, enters via the regulator valve, 89, and leaves via the pipe, 90, after cooling and condensing refrigerant vapor from which the cooling water is kept fully separated. The refrigerant thus condensed flows via the pipe, 91, into the liquid receiver, 73. The flow rate of cooling water can be controlled by the regulator, 89, in response to its connected refrigerant pressure sensor, 92, so that cooling water flow rate increases when refrigerant high pressure increases above a set value and so that cooling water flow rate decreases when refrigerant high pressure decreases below a set value. In this way, the auxiliary refrigerant condenser, 88, of FIG. 5 can function, not only to assure full condensation of all evaporated refrigerant, but also to hold an essentially constant pressure and hence temperature in those container jackets being heated by refrigerant condensation. This condensing pressure and hence temperature can be adjusted by adjusting the regulator, 89, and sensor, 92.

13. A means for opening and closing the changeable container gas flow connections and also the changeable heating and cooling connections is needed together with a control means for controlling these means for opening and closing so that each container pressure vessel passes through a sequence of time periods of open gas flow connections and so that each container jacket passes concurrently through a sequence of open heating and cooling connections as follows:

(a) each container pressure vessel inlet is opened for a time period separately to each outlet of each stage of the compressor, 34, in a subsequence of time periods of open gas flow connections to compressor outlets, this compressor subsequence proceeding in time order of increasing compressor stage delivery pressure and hence in the time order, 35, 41;

(b) each container pressure vessel outlet is opened for a time period separately to each inlet of each stage of each separate expander, 43, 51, 54, in a subsequence of time periods of open gas flow connections to expander inlets, this expander subsequence proceeding in time order of decreasing expander stage inlet pressure and hence in the time order, 43, 51, 54;

(c) the subsequence of connections to compressor outlets is followed by the subsequence of connections to expander inlets and these together comprise one sequence of time periods of open gas flow connections, each such sequence for each container pressure vessel being then repeated;

(d) each compressor outlet, 35, 41, always has an open gas flow connection to a single container pressure vessel inlet and each expander inlet, 43, 51, 54, always has an open gas flow connection to a single container pressure vessel outlet whenever the plant is operating;

(e) each container pressure vessel has but one open gas flow connection during each time period;

(f) each container jacket is connected for cooling, between the expansion valve, 74, and the refrigerant compressor inlet, 70, in a subsequence of cooling time periods whenever that container is being compressed, as, for example, containers 39, 40, in FIGS. 2 and 3; this subsequence of cooling time periods is concurrent with the subsequence of open gas flow connections to compressor outlets for each container;

(g) each container jacket is connected for heating, between the refrigerant compressor outlet, 71, and the refrigerant liquid receiver, 73, in a subsequence of heating time periods whenever that container is being expanded, as, for example, containers, 44, 49, 50, in FIGS. 2 and 3; this subsequence of heating time periods is concurrent with the subsequence of open gas flow connections to expander inlets for each container;

(h) these means for opening and closing changeable connections and these means for controlling the means for opening and closing are not shown in FIGS. 2, 3, 4, 5, to avoid undue complexity of these drawings. Examples of suitable opening and closing means and control means will be described hereinafter.

In the operation of the example cyclic gas separator machine shown in FIGS. 2, 3, 4, 5, each container pressure vessel is connected in a sequence of open gas flow connectings to the discharge end of each compressor stage and to the inlet end of each expander stage. This sequence of gas flow connectings starts with the lowest pressure stage of the compressor, proceeds, in turn, through each next higher pressure stage of the compressor, and after the highest pressure compressor stage, continues to the highest pressure stage of the first expander and then proceeds, in turn, through each next lower pressure stage of each expander. After a container pressure vessel has proceeded through this full sequence, the sequence can subsequently be repeated again and again. While a container pressure vessel is connected to compressor outlets, the container jacket is connected to the heating and cooling means for cooling. While a container pressure vessel is connected to expander inlets, the container jacket is connected to the heating and cooling means for heating. For example, in FIGS. 4 and 5 the foregoing sequence of connectings for container 49 can be carried out as follows: valve 58 is opened and valves 59, 60, 61, 62, are closed and the pressure vessel of container 49 is connected only to the discharge of the lowest pressure compressor stage, 35; concurrently, valves, 86, and, 87, are opened and the jacket of container, 49, is connected for cooling between the expansion valve, 74, and the refrigerant compressor inlet, 70; after a time interval valve 58 is closed and concurrently valve 59 is opened and the pressure vessel of container 49 is then connected only to the discharge of the next higher compressor stage, 41; concurrently, valves, 86, and, 87, remain open and the jacket of container, 49, continues to be connected for cooling; after the next time interval valve 59 is closed and concurrently valve 60 is opened and the pressure vessel of container 49 is then connected only to the inlet end of the highest pressure expander, 43; concurrently, valves, 86, and, 87, are closed and valves, 79, and, 82, are opened and the jacket of container, 49, is connected for heating between the refrigerant compressor outlet, 71, and the liquid refrigerant receiver, 73; after the next time interval, valve 60 is closed and concurrently valve 61 is opened and the pressure vessel of container 49 is then connected only to the inlet end of the next lower pressure expander, 51; concurrently, valves, 79, and, 80, remain open and the jacket of container, 49, continues to be connected for heating; after the next time interval valve 61 is closed and concurrently valve 62 is opened and the pressure vessel of container 49 is then connected only to the inlet end of the lowest pressure expander, 54; concurrently, valves, 79, and, 80, remain open and the jacket of container, 49, continues to be connected for heating; after the next time interval, the valves, 62, 79, 80, are closed and concurrently valves, 58, 86, 87, are opened and one sequence and cycle of gas flow connectings has been completed and the next sequence and cycle is about to commence. Each of the other containers, 39, 42, 44, 50, also has similar connections and valves to each compressor and expander stage and to the heating and cooling means and also is similarly connected in sequence in the same manner as described for the one container, 49, except that each container follows out its sequence of connectings in a time order displaced from that of all the other containers so that any one compressor or expander stage is connected to but one container pressure vessel. So that each stage will always have one container pressure vessel connected, the several container pressure vessels change gas flow connectings all at the same time and thus the time interval between changes of gas flow connectings, tcc, is the same as between different containers even though it may differ as between different time intervals in a sequence. The cycle time, tc, is then equal to the product of the time interval between changes of gas flow connectings, tcc, if constant, and the sum of the number of containers being compressed, nc, and the number of containers being expanded, nx, which sum also equals the sum of the total number of compressor stages and the total number of expander stages.

$$tc = (tcc)(nc + nx)$$

The cycle time, tc, is basically determined by how long it takes the compressor to pump up a container pressure vessel from the selected value of minimum cycle pressure, PO, up to the selected value of maximum cycle pressure, PM, and clearly increases with increasing container pressure vessel gas space volume and with decreasing compressor flow rate capacity, ma.

Within each container pressure vessel during compression, the surface force material captures those molecules of the entering mixed gas as are strongly attracted on or adjacent those surfaces nearest the inlet. Those mixed gas molecules only moderately attracted to the surface will become captured on or adjacent those surfaces farther inside the pressure vessel. And those mixed gas molecules only weakly attracted to the surface will not be appreciably captured and will occupy those gas spaces near the outlet end of the pressure vessel. When expansion first commences, it is the weakly attracted molecules which will expand into the first product gas collector pipe, 45, via the high pressure expander, 43. Subsequently, when the moderately attracted molecules commence leaving the container pressure vessel, the container outlet has changed connections so that these different gases expand into the second product gas collector pipe, 53, via the intermediate pressure expander, 51. Finally, when the strongly attracted molecules commence leaving the container pressure vessel, the container outlet has again changed connections so that these further different gases expand into the third product gas collector pipe, 56, via the low pressure expander, 54, So that the composition of the product gas emerging from the container pressure vessel outlet will change as intended at the same time that the containers undergo the indicated changes of connections, the three expander flow rate controllers, 93, 94, 95, adjust the expander flow rate during the preceding time interval so that each container pressure vessel pressure is reduced to that change pressure at which the next composition change occurs during that time interval. We thus see that the combined actions of the compression process, the surface force acting differently on the gas molecules, the unidirectional flow of the gas across the surface and the divided expansion process, have continuously separated the mixed gas from the source, 37, into three different gas products in the three separate product gas collector pipes, 45, 53, 56, with none of these separated product gases diluted. The capture process necessary to this separation is accelerated by the cooling of those container pressure vessels being compressed. The escape process of the captured molecules also necessary to this separation is accelerated by the heating of those container pressure vessels being expanded.

One example of a means for opening and closing the changeable container gas flow connections and for opening and closing the changeable heating and cooling connections and for adjusting the time interval between changes of gas flow connections, tcc, and suitable for use with the cyclic gas separator machine shown in FIGS. 2, 3, 4, 5, is shown in FIGS. 8, 9, 10, 11, 12, 13, in outline form. This example, primarily mechanical, means for opening and closing and for control of tcc comprises the following:

1. A single lobe cam, 96, is rotated in the direction, 103, by the cam drive shaft, 97, and opens the changeable gas flow connections valves, 46, 108, whenever the cam raised section, 98, passes under the valve cam followers, 99, 100, 105, 106, 107, and these valves are closed by the closing springs, 101, 102, whenever the cam raised section is not under the valve cam follower. The arc, 104, of the cam raised section, 98, is made sufficient that when one valve, say 108, is closing, the next valve, 46, is concurrently opening. The cam followers are positioned equiangularly about the centerline of the drive shaft, 97, separated by 72 degrees and this is also about the arc of the cam raised section, 98.

Figure 8:
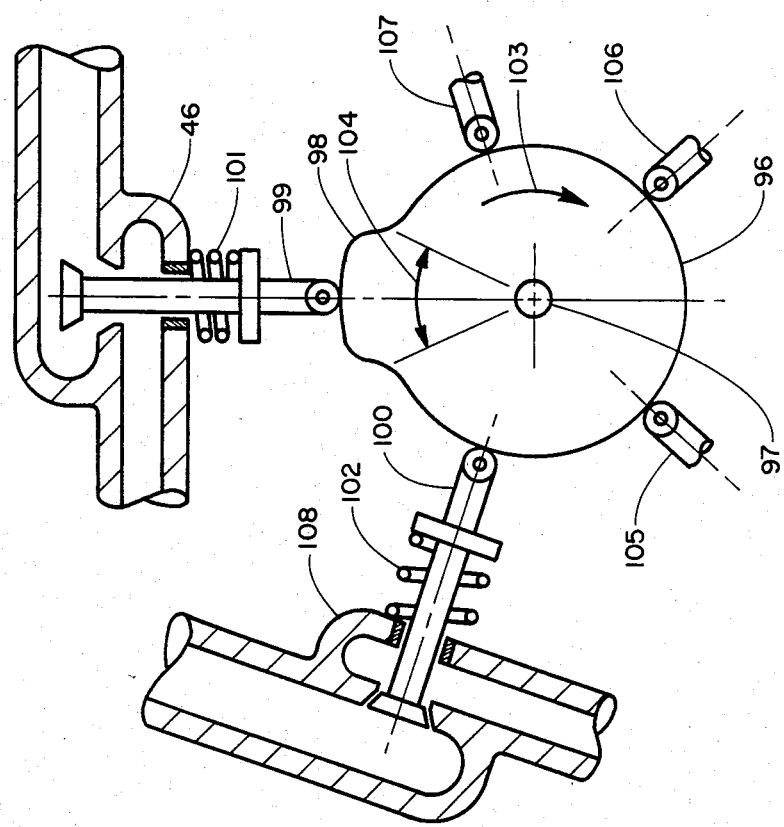

2. Only two, 46, 108, of the changeable gas flow connection valves are shown in FIG. 8, but all twenty-five of these valves for all five container pressure vessels are positioned similarly around the cam, 96, with the five such valves to be opened concurrently being at the same angular position so that all are opened simultaneously by motion of the cam raised section, 98. For example, as shown in FIG. 8, the cam raised section 98 has opened the five changeable gas flow connection valves, 46, 47, 48, 52, 55, so that the container pressure vessels are connected to the compressor and the expanders as shown in FIG. 2. When the time interval shown thusly in FIG. 2 and FIG. 8 is ended, the cam raised section, 98, is moved on 72 degrees in the direction, 103, so that the cam follower, 107, is lifted and the cam follower, 99, is lowered. Thus, the changeable gas flow connections are then changed for the next time interval so that container, 39, inlet connects to the high pressure compressor, 41, outlet, container 42, outlet connects to the high pressure expander, 43, inlet, container, 44, outlet connects to the intermediate pressure expander, 51, inlet, container, 49, outlet connects to the low pressure expander, 54, inlet, and container, 50, inlet connects to the low pressure compressor, 35, outlet.

Figure 9:
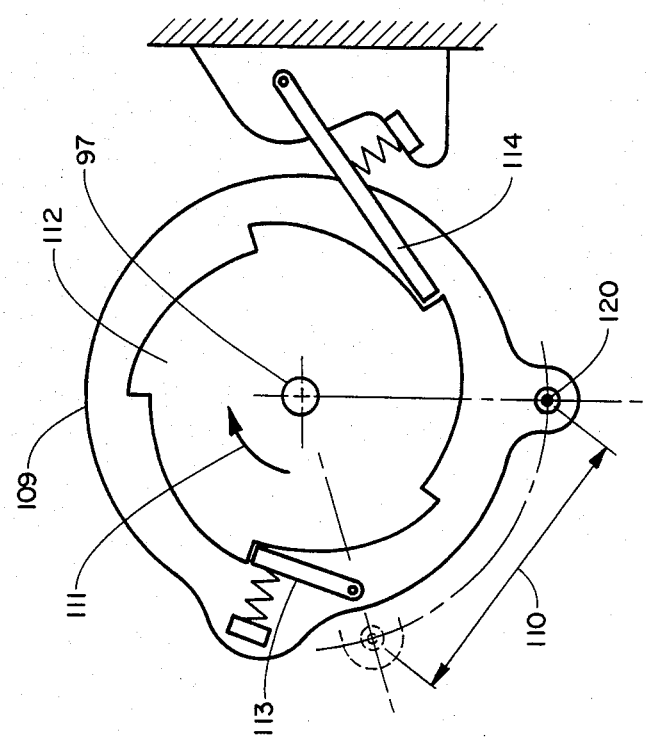
In FIGS. 8, 9, 10, 11, a means for opening and closing changeable gas flow connections between container pressure vessels and compressor outlets and expander inlets is shown schematically together with a means for controlling this means for opening and closing.

3. A portion of the drive means for driving the shaft, 97, in the direction, 103, when a time interval ends and the changeable gas flow connections are to be changed is shown in FIG. 9. A rocker plate, 109, rocks back and forth through the distance, 110, and while moving in the direction, 111, rotates the shaft, 97, via the ratchet plate, 112, and the drive pawl, 113. When the rocker plate, 109, returns the motion, the ratchet plate, 112, and hence the shaft, 97, are prevented from back rotation by the stop pawl, 114. In this way, the drive shaft, 97, and hence the cam, 96, are moved intermittently through a 72 degree arc in the direction, 103, in FIG. 8 and only when a time interval ends and the changeable gas flow connections are to be changed.

Figure 11:
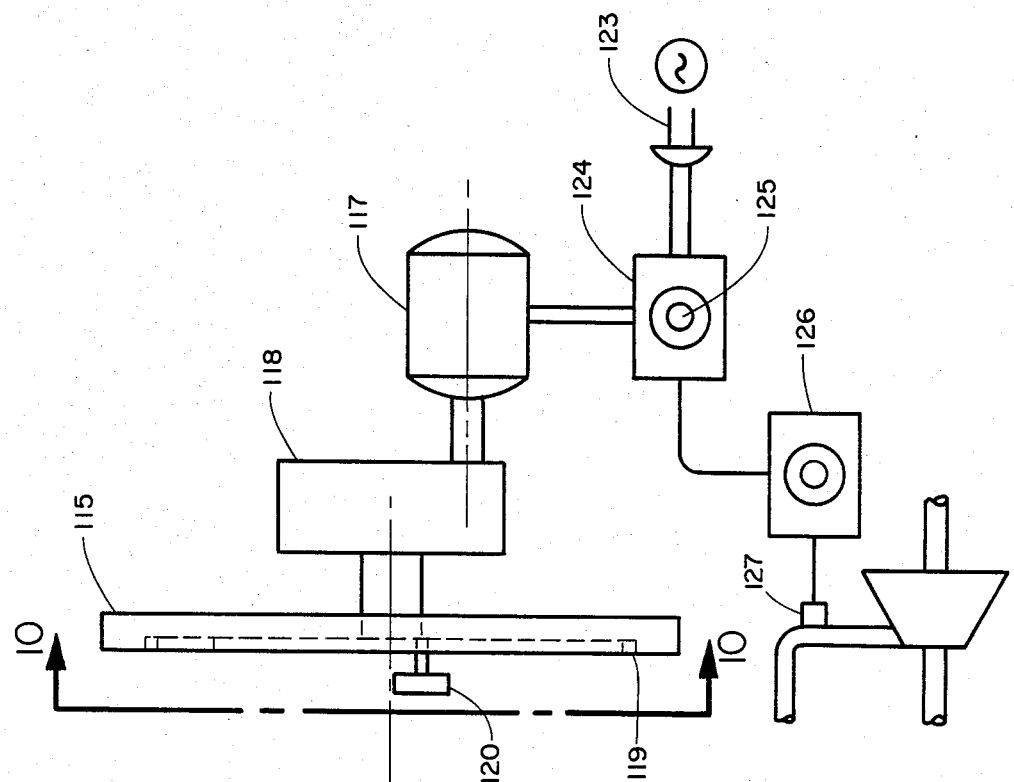
Figure 10:
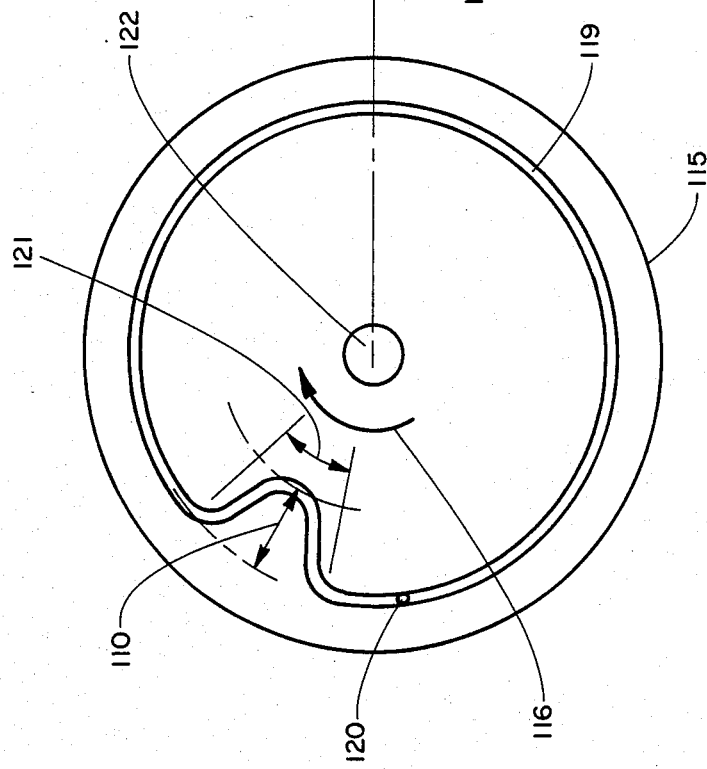

4. Another portion of the drive means for driving the shaft, 97, in the direction, 103, when a time interval ends is shown in FIGS. 10 and 11. A slotted cam disc, 115, is rotated in the direction, 116, by the electric motor, 117, via the gear box, 118. The slot, 119, of the cam disc, 115, engages a captured pin, 120, on the rocker plate, 109, so that the pin, 120, and hence the rocker plate, 109, are moved through the distance, 110, whenever the action arc portion, 121, of the cam disc, 115, passes the pin, 120. Thus, the time interval between changes of gas flow connectings, tcc, equals the time interval for the cam disc, 115, to complete one revolution about its centerline of rotation, 122.

5. The variable speed electric motor, 117, is energized from a power source, 123, via the motor speed setter, 124, so that the speed of the motor, 117, and hence the disc cam, 115, can be adjusted and in this way the time interval between changes of gas flow connectings, tcc, can be adjusted. This adjustment of tcc can be done by hand, as via the speed setter knob, 125, or automatically.

6. The cycle time interval, tc, for one container pressure vessel to complete a full sequence of changeable gas flow connectings to compressor outlets and to expander inlets equals the time interval for the cam, 96, to complete one revolution. Thus, adjustment of tcc also produces adjustment of tc.

7. For the example cyclic gas separator machine of FIGS. 2, 3, 4, 5, as described hereinabove, a constant value of cycle time and time interval between changes of gas flow connectings may be used in some applications since maximum compression pressure is controlled via compressor inlet density adjustment and since expander flow rates are controlled to secure full removal of each separated product gas during each time interval. For these applications, the drive motor, 117, can be a constant speed motor. In other applications using this same described cyclic gas separator, occasional hand adjustment of tc and tcc may be preferred in order to compensate for slow changes in plant operation as may be caused, for example, by slow reduction of the surface forces caused by surface contamination with extremely strongly held impurities in the mixed gas. For these other applications the variable speed motor, 117, with hand speed adjustment, 125, may be preferred as described above.

8. If automatic adjustment of cycle time and time interval between changes of connectings is to be used, a controller, 126, responsive to a sensor, 127, and acting upon the motor speed setter, 124, can be used in various ways. For example, if compressor inlet density is essentially constant and not adjustable, the sensor, 127, can sense maximum pressure reached during compression and decrease speed of motor, 117, when this maximum pressure is below a set value and increase speed of motor, 117, when this maximum pressure is above a set value. By thus adjusting the duration of compression, the sensor, 127, and controller, 126, can function to hold maximum compression pressure between set limits. Alternatively, if expander flow rates are not automatically adjusted, the sensor, 127, can sense product gas composition changes occurrence at one of the expander inlets and decrease speed of motor, 117, when the proper composition change reaches that expander too late, and increase speed of motor, 117, when the proper composition change reaches that expander too soon. By thus alternatively adjusting the time interval between changes of gas flow connectings, the sensor, 127, and controller, 126, can function to maintain product gas separation at least as between two separate product gases.

Figure 13:
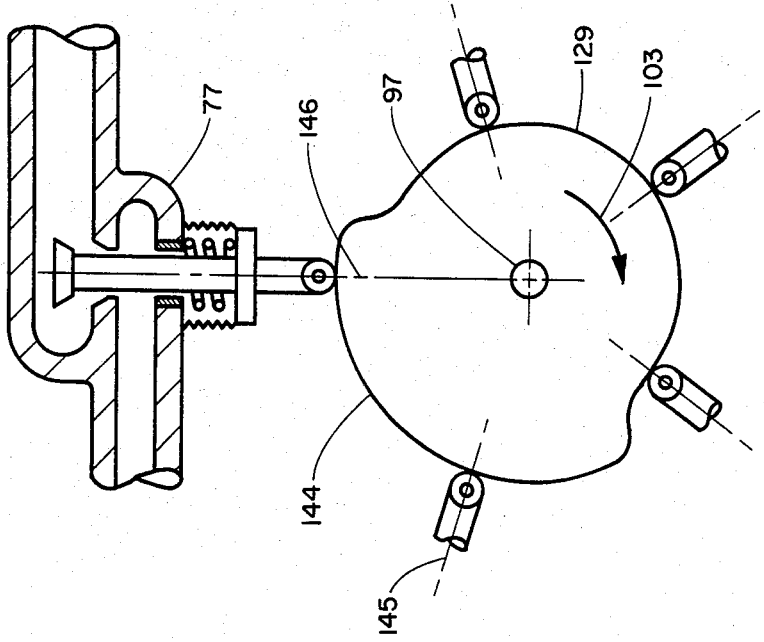
In FIGS. 12, 13, a means for opening and closing changeable heating and cooling connections between container jackets and a heating and cooling means is shown schematically which is useable also with the means for opening and closing and the means for controlling shown in FIGS. 8, 9, 10, 11.
Figure 12:
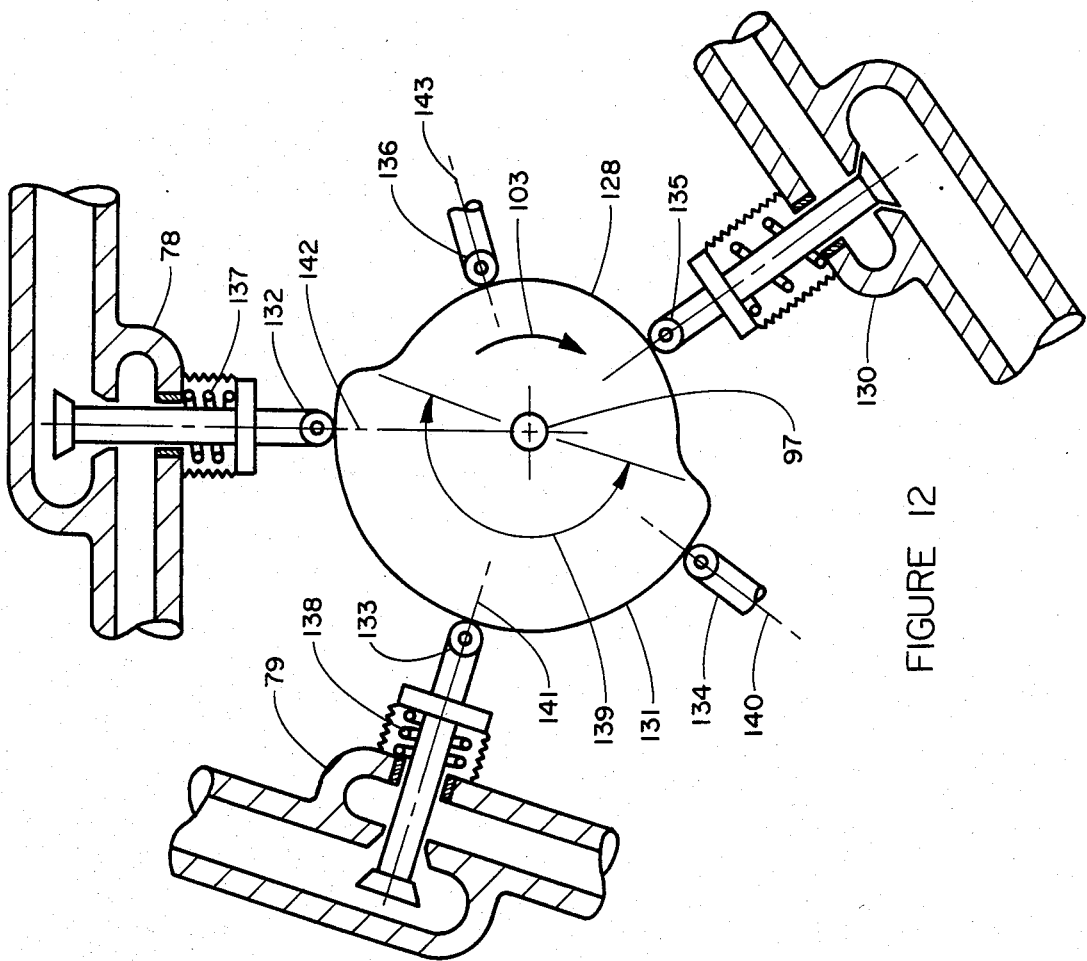

9. For the opening and closing of the changeable heating and cooling connections of the cyclic gas separator of FIGS. 2, 3, 4, 5, a heating cam, 128, and a cooling cam, 129, are also driven by the same cam drive shaft, 97, as is shown in FIGS. 12 and 13. The single lobe heating cam, 128, is rotated in the direction, 103, by the cam drive shaft, 97, and opens the changeable heating connections valves, 78, 79, 130, whenever the cam raised section, 131, passes under the valve cam followers, 132, 133, 134, 135, 136, and these valves are closed by the closing springs, 137, 138, whenever the cam raised section is not under the valve cam follower. The arc, 139, of the cam raised section, 131, is made sufficient that three sets of valves at three different angular positions, say, 140, 141, 142, are held open during any one time interval, and so that when one valve set, say those at angular position, 140, are closing, the next valve set at angular position, 143, is concurrently opening. The cam followers are positioned equiangularly about the centerline of the drive shaft 97, separated by 72 degrees and thus the arc of the cam raised section, 131, is about 216 degrees.

10. Only three, 78, 79, 130, of the changeable heating connection valves are shown in FIG. 12 but all of these heating valves for all five containers are positioned similarly around the heating cam, 128, with the two such valves to be opened or closed concurrently being at the same angular position so that both are opened simultaneously by motion of the cam raised section, 131, and are then held thusly open through three time intervals. For example as shown in FIG. 12, the heating cam raised section, 131, has opened the six changeable heating connection valves, 78, 79, 80, 83, 82, 81, so that the container jackets are connected for heating between the refrigerant compressor outlet, 71, and the refrigerant liquid receiver, 73, as shown in FIG. 3 and FIG. 2. When the time interval shown thusly in FIGS. 2, 3, 12, is ended, the heating cam raised section, 131, is moved on 72 degrees in the direction, 103, so that the cam follower, 136, is lifted, and the cam follower, 134, is lowered and some of the changeable heating connection valves correspondingly opened and closed. In this way, the changeable heating connections are changed for the next time interval so that containers, 44, 49, continue to be heated, container, 50, is no longer heated, and container, 42, commences being heated. Thus, a container jacket is always connected for heating whenever that container pressure vessel is being expanded.

11. The single lobe cooling cam, 129, of FIG. 13 is similarly driven by the cam drive shaft, 97, to open and close the ten changeable cooling connections valves as required to assure that a container jacket is always connected for cooling between the refrigerant expansion valve, 74, and the refrigerant compressor inlet, 70, whenever that container pressure vessel is being compressed. Since, for FIGS. 2, 3, 4, 5, there are two containers undergoing compression during any one time interval, the cooling cam raised section, 144, is of about 144 degrees arc length so that it holds open two sets of changeable cooling connection valves, as, say, those four valves located at angular positions, 145, 146, as shown in FIG. 13, for any one time interval.

The primarily mechanical means for opening and closing the changeable connections and control means for controlling this means for opening and closing shown in FIGS. 8, 9, 10, 11, 12, 13, is only one example of such means and other means can alternatively be used. For example, solenoid openers and spring closers with cascaded relay solenoid energizer means can be used as a means for opening and closing and for control thereof such as is described in my copending cross-referenced application, Ser. No. 06/546,093, on page 54 line 17 through page 59 line 18, and this material is incorporated herein by reference thereto. Alternatively, the pneumatic-hydraulic means for opening and closing and for control of cycle time can be used as described in my copending cross-referenced application, Ser. No. 06/546,093, now issued at U.S. Pat. No. 4,455,837, on page 59 line 19 through page 61 line 21, and this material is incorporated herein by reference thereto. Yet other means for opening and closing the changeable connections and for control thereof can also be used.

The containers comprise the elongated pressure vessel, within which the surface force material is placed, an inlet at one end, and an outlet at the other end. Where heating and cooling of the surface force material is used, a heating and cooling jacket may be added and placed around the pressure vessel means with an inlet for the cooling and heating fluid and an outlet therefor. Various types and arrangements of containers are useable for the purposes of this invention. An example double pipe container is shown in FIG. 6 whose inner pipe, 147, is the elongated pressure vessel with mixed gas inlet, 148, at one end and product gas outlet, 149, at the other end. The outer pipe, 150, is the heating and cooling jacket with inlet, 151, and outlet, 152. The surface force material, 153, can be packed inside the inner pipe provided sufficient gas throughflow area remains so that gas can flow through the pressure vessel, 147, without excess pressure drop. This double pipe container can readily give the high length to diameter ratios for the pressure vessel desired in order to reduce diffusion remixing. Also the desired high surface to volume ratio inside the pressure vessel can be secured by fully packing in the surface force material in granular or other form.

Where flow area problems are encountered with the double pipe container of FIG. 6, the example shell and tube container of FIG. 7 can be used wherein several parallel flow paths are provided. The several parallel flow tubes, 154, are the elongated pressure vessel with common inlet, 155, at one end and common outlet, 156, at the other end. The shell, 157, is the heating and cooling jacket with inlet, 158, and outlet, 159. The surface force material, 160, is again packed inside each tube of the elongated pressure vessel.

Where the surface force material is porous, such pores are preferably open ended or through pores so that backflow of gases and consequent remixing can be avoided and so that additional throughflow area can be obtained.

The kind of surface force material to be used depends upon the mixed gas composition and the desired type of separation. Activated charcoal and silica gel can be used for various gas separations such as: separating $SO_2$ from combustion gases; separating $CO_2$ from combustion gases; separating $O_2$ from $N_2$ in air; separating $CH_4$ from sewer gases. Activated alumina is suitable for separating hydrocarbons. Molecular sieves are suitable for various gas separations such as those listed for activated charcoal. Some naturally occurring materials are also useable as surface force materials such as diatomaceous earth. For some separations a liquid surface force material is preferred, and this liquid is then spread out over the surface of a solid support material such as firebrick. Ethylene glycols have been used for hydrocarbon separations and for ketone separations. Silicone oils have been used for separating alcohols. Information on surface force material selection, preparation and installation is presented in reference A.

Figure 14:
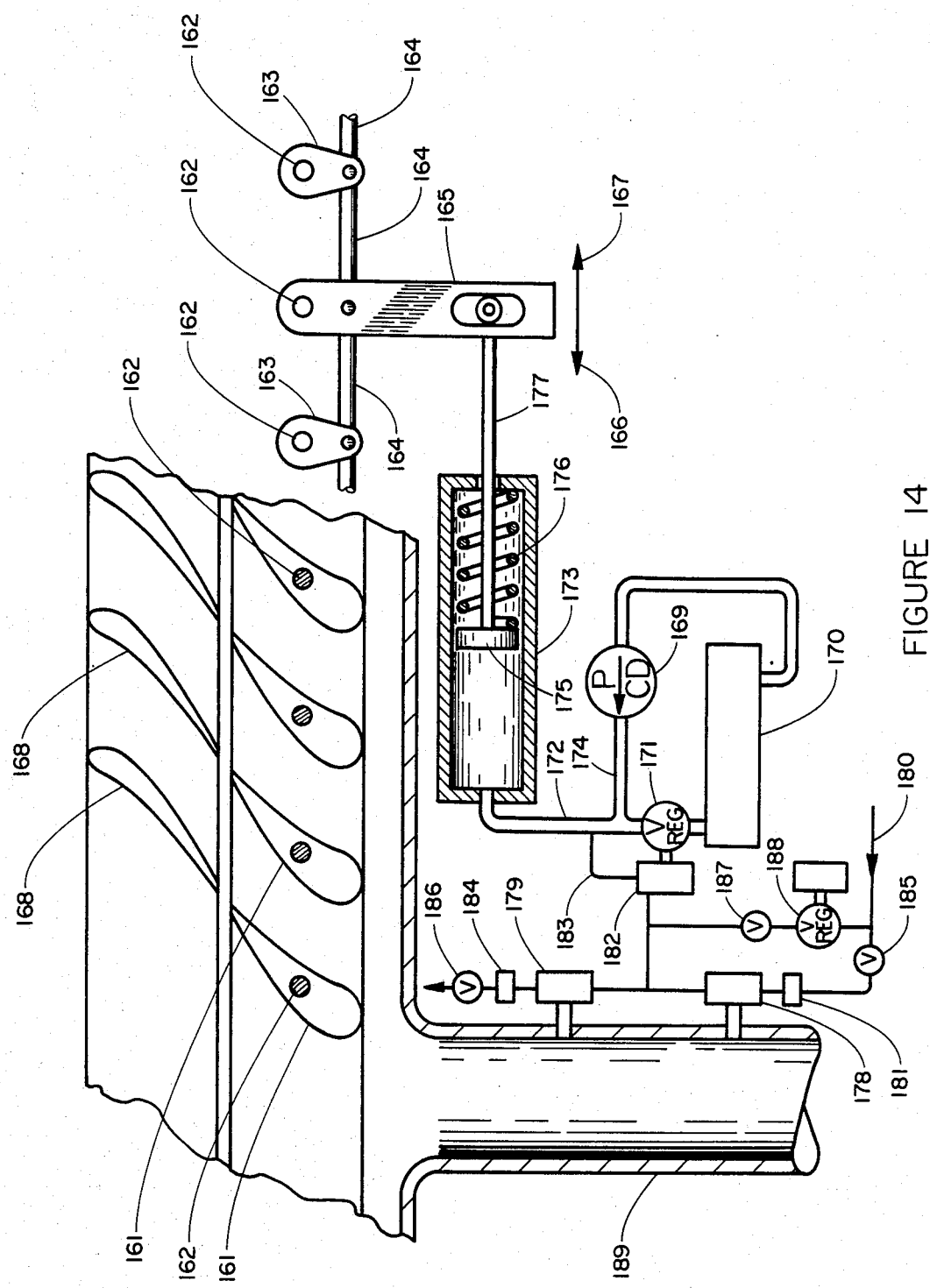
In FIG. 14 an expander flow rate control means is shown.

Although ordinary throttling valves are the simplest type of expander flow rate control, these reduce the work output of expander engines. Where expander engines are turbines, the flow rate can be more efficiently controlled by control of the expander first nozzle flow area. An example of such a first nozzle flow area controller is shown in outline in FIG. 14 wherein the first turbine stationary nozzle guide vanes, 161, are rotatable about their pivots, 162, by moving the pivot levers, 163, via the link bars, 164, which link all pivot levers, 163, and hence all guide vanes, 161, together. The control bar, 165, when moved in the direction, 166, moves all levers and hence guide vanes in a manner which reduces the first nozzle flow area and hence reduces expander flow rate. Nozzle flow area and expander flow rate are correspondingly increased when the control bar, 165, is moved in the direction, 167. The gas expanding through the stationary nozzle guide vanes, 161, is directed thereby onto the moving turbine blades, 168, where expander work is done in slowing down these expanding gases. A hydraulic activator is shown in FIG. 14 as one example means for moving the control bar, 165, and comprises a constant displacement hydraulic pump, 169, driven by a motor and pumping hydraulic fluid from a reservoir, 170, through a back pressure regulating valve, 171, and back into the reservoir, 170. A pipe, 172, connects also to the activator cylinder, 173, from the high pressure discharge, 174, of the hydraulic pump, 169, so that the high pressure hydraulic fluid also acts upon the activator piston, 175, in opposition to the actuator spring, 176. The actuator piston, 175, connects to the control bar, 165, by the link, 177, so that when hydraulic pressure increases the piston, 175, moves against the spring, 176, to move the control bar, 165, in the direction, 167, and thus increases the nozzle flow area. When hydraulic pressure decreases, the reverse effects occur and nozzle flow area is reduced. In this way, expander flow rate can be controlled by controlling the back pressure to which the regulator, 171, controls. Expander inlet pressure sensors, 178, 179, are used on the example flow rate controller of FIG. 14, with one sensor, 178, sensing maximum expander inlet pressure in the expander inlet pipe, 189, at the start of a time interval and the other sensor, 179, sensing minimum expander inlet pressure at the end of a time interval. The regulator, 171, functions via the backpressure connection, 183, to maintain the hydraulic pressure at hydraulic pump outlet, 174, equal to or proportional to the control gas pressure set in the balance chamber 182. When maximum expander inlet pressure is above a set value the sensor, 178, opens to admit high pressure control gas from a source, 180, via an orifice, 181, into the balance chamber, 182, of the regulator, 171, and thus the hydraulic pressure acting on piston, 175, is increased, nozzle flow area is increased, and expander flow rate is increased in order to flow gas more quickly out of the connected container whose starting pressure for the time interval was too high. When minimum expander inlet pressure is below a set value, the sensor, 179, opens to release control gas from the balance chamber, 182, via an orifice, 184, and thus the hydraulic pressure acting on piston, 175, is reduced, nozzle flow area is reduced, and expander flow rate is reduced in order to flow gas less quickly out of the next to be connected container, presumably of similar pressure to that connected. In this way the sensors 178, 179, can function to assure that each container is expanded down to the change pressure at which the next gas composition change occurs during each time interval between changes of gas flow connectings. This expander flow rate control scheme of FIG. 14 can be modified for hand control of expander flow rate by closing the valves, 185, 186, opening the valve, 187, and adjusting the control gas pressure in the balance chamber, 182, by hand adjustment of the regulator, 188. Various other types of expander flow rate control means are also suitable for use with cyclic gas separators of this invention. Examples of some alternative expander flow rate control means are described in my cross referenced application Ser. No. 06/546,093, now issued as U.S. Pat. No. 4,455,837, on page 62 line 8 through page 63 line 22, and this material is incorporated herein by reference thereto. Various other types of sensors for control of expander flow rate can be used in lieu of the expander inlet pressure sensors shown in FIG. 14, such as expander inlet gas composition sensors.

In some separators, where certain molecules are very strongly held by the surface force material, we may prefer to continue expansion down to pressures lower than the product gas pressure in the collector pipe and for these purposes a vacuum pump and vacuum expander can be added to the cyclic gas separator machine. The vacuum pump functions to further reduce the pressure inside the container pressure vessel and thus aids in additional removal and purging of captured molecules but requires a work input to the vacuum pump. The vacuum expander functions to first readmit mixed gas into a container pressure vessel when vacuum pumping has ceased and recompression with mixed gas first commences. This vacuum expander can be a simple throttling valve or an expander engine with power means to absorb the engine work. Note the terminology problem here where the vacuum pump, a compressor, is connected to the outlet of container pressure vessels being expanded, whereas the vacuum expander is connected to the inlet of container pressure vessels being compressed.

Figure 15:
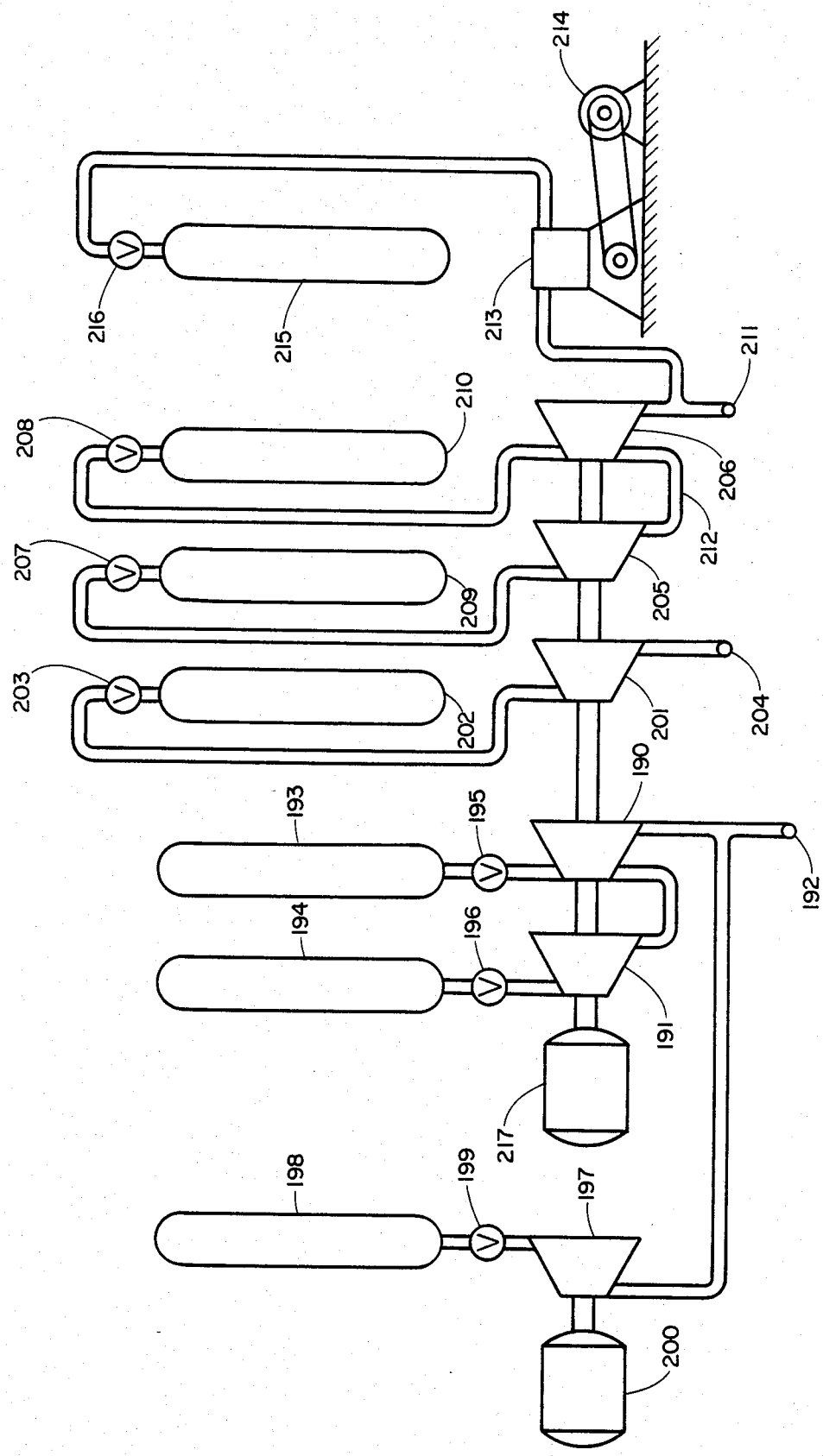
In FIG. 15 the use of vacuum pumps and vacuum expanders with a cyclic gas separator machine is shown.

One particular example of a cyclic gas separator machine using vacuum pumps and vacuum expanders is shown schematically in FIG. 15 and comprises the following:

(1) A two stage compressor, 190, 191, pumps mixed gas from the source, 192, into the inlets of two connected container pressure vessels, 193, 194, via changeable gas flow connections, 195, 196.

(2) A vacuum expander engine, 197, also admits mixed gas from the source, 192, at source pressure into the inlet of the connected and previously evacuated container pressure vessel, 198, via the changeable gas flow connection, 199. The work output of the expander engine, 197, is absorbed by the power means, 200.

(3) A first separate expander, 201, to which the outlet of container pressure vessel, 202, connects via the changeable gas flow connection, 203, first after completion of compression discharges a first product gas into the first product gas collector pipe, 204.

(4) A second separate expander of two stages, 205, 206, connects via changeable gas flow connections, 207, 208, to the outlets of two container pressure vessels, 209, 210. The high pressure stage, 205, is connected to by a container outlet next after that container has been connected to the first separate expander, 201, and the low pressure stage, 206, is connected to by a container outlet next after that container has been connected to the high pressure stage, 205. The discharge of the high pressure stage, 205, enters the inlet of the low pressure stage, 206, via fixed open gas flow pipe, 212, and the thusly combined discharge second product gas passes into a second product gas collector pipe, 211.

(5) A vacuum pump, 213, is driven by a power means, 214, and pumps gas from the outlet of container pressure vessel, 215, via changeable gas flow connection, 216, into the second product gas collector pipe, 211.

(6) A power means, 217, supplies work needed to drive the compressor stages, 190, 191, and/or to absorb the work output of the expanders, 201, 205, 206.

The operation of those portions of the cyclic gas separator of FIG. 15 other than the vacuum pump and vacuum expander is essentially similar to that already described for the cyclic gas separator of FIGS. 2 and 4, except that a multistage expander, 205, 206, is used wherein the product gas from both expander stages enters finally the same product gas collector pipe, 211. Such use of multistage expanders will usually be preferred only in applications where one of the gas molecules is very strongly held by the surface force material and more than one time interval is needed in order to remove this strongly held gas product. These are also the applications where a vacuum pump, 213, may be added to further continue the gas expansion and removal from the container pressure vessel, 215, for yet another time interval between changes of connectings. The thusly additionally purged strongly held gas molecules are then pumped by the vacuum pump, 213, into the same product gas collector pipe, 211. Thereafter, the vacuum expander, 197, next connects to a container pressure vessel, 198, inlet and recompression of the pressure vessel commences by admission of mixed gas into the previously evacuated pressure vessel. A vacuum expander engine, 197, and work absorbing power means, 200, are shown in FIG. 15 but a simple throttling expander can alternatively be used since the work to be recovered here is usually small. Note that two extra container pressure vessels are used in FIG. 15, one for connections to the vacuum pump and another for connections to the vacuum expander.

In some applications none of the molecules of the mixed gas are captured very strongly and full purging and removal during expansion can be accomplished quickly and perhaps in a single time interval. For some of these cases, a single expander may be preferred with two or more changeable expander discharge gas flow connections which can be opened and closed so that the discharge gas can be directed first into one product gas collector pipe, then into the next product gas collector pipe, and so on through the two or more product gas collector pipes connectable to that expander during each single time interval between changes of container gas flow connections. With this alternate cyclic gas separator arrangement, a single expander connected to a single container pressure vessel can deliver two or more different product gases into two or more separate product gas collector pipes. This arrangement with changeable expander discharge gas flow connections has the advantage of lower plant cost and the disadvantages of intermittent product gas flow and increased interproduct mixing within the expander. In addition to the changeable expander discharge gas flow connections, an expander discharge means for opening and closing these changeable connections is needed together with a control means for controlling this means for opening and closing so that:

(1) each expander always has one open gas flow connection to one product gas collector pipe during all time intervals when the machine is operating;

(2) each expander equipped with changeable expander discharge gas flow connections is connected for a discharge time period separately to each of the product gas collector pipes with which it has such changeable gas flow connections in a subsequence of discharge time periods to product gas collector pipes;

(3) a single subsequence of discharge time periods is completed within each time interval between changes of container gas flow connections.

The changeable expander discharge gas flow connections, the means for opening and closing these connections and the control means for controlling this means for opening and closing constitute an expander discharge means for connecting the expander discharge to the product gas collector pipes which is changeable rather than fixed. This changeable expander discharge means for connecting can be essentially similar to any of the corresponding changeable container gas flow connections, means for opening and closing, and control means therefor, as described hereinabove. Frequently, however, we will prefer that the control means for controlling the means for opening and closing be responsive to a gas composition sensor in the expander discharge so that when the product gas emerging from the expander changes composition, the changeable expander discharge connections are changed to redirect the product gases into the product gas collector pipe next following in the subsequence of discharge time periods. A cyclic gas separator machine of this invention can also comprise, one or more expanders each of whose discharges connect separately to but one product gas collector pipe, combined with one or more expanders with changeable expander discharge gas flow connections, each of whose discharges is connectable separately to two or more product gas collector pipes. Combination cyclic gas separators of this type might be preferred when, for example, a mixed gas is to be separated into a first group of two or more product gases, all of which are weakly held and hence escape quickly, and a second group of two or more product gases, all of which are strongly held and escape more slowly.

Figure 16:
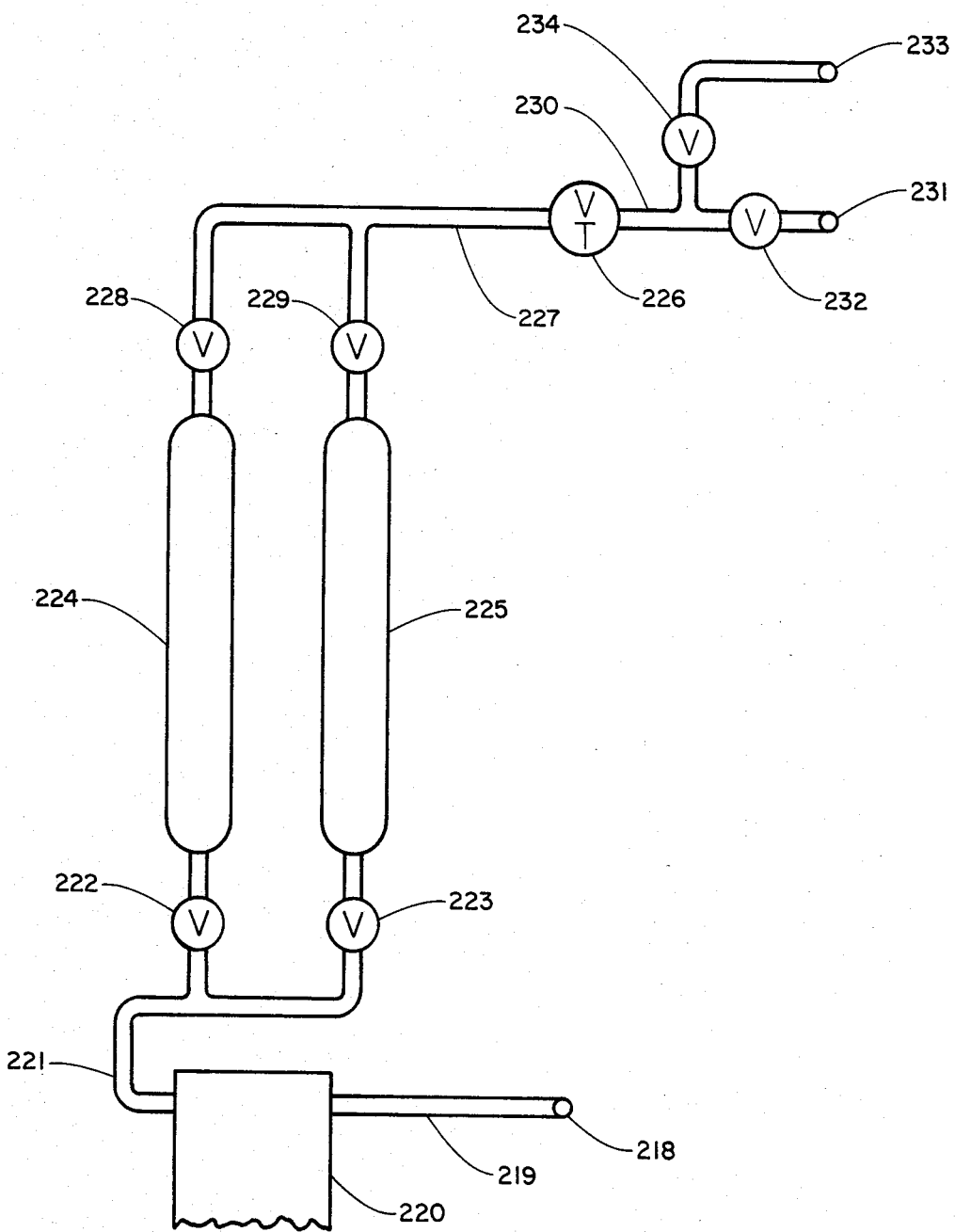
In FIG. 16 a modified cyclic gas separator machine is shown partially with a single expander having changeable expander discharge connections.

One example of a cyclic gas separator machine using a single expander with changeable expander discharge gas flow connections is shown partially and schematically in FIG. 16 and comprises:

(1) A source of mixed gas to be separated, 218, connects to the intake, 219, of a compressor, 220, whose discharge, 221, has changeable container gas flow connections, 222, 223, to the inlets of two container pressure vessels, 224, 225.

(2) A single throttling blowdown expander, 226, is connected at inlet, 227, to the outlets of the two container pressure vessels, 224, 225, via the changeable container gas flow connections, 228, 229.

(3) The outlet, 230, of the single expander, 226, is connectable to the first product gas collector pipe, 231, via the changeable expander discharge gas flow connection, 232, and is connectable to the second product gas collector pipe, 233, via the changeable expander discharge gas flow connection, 234.

The example cyclic gas separator of FIG. 16 operates to separate the mixed gas from the source, 218, into two differing product gases in the two product gas collector pipes, 231, 233, as follows:

(a) Container changeable gas flow connections, 222, 229, are opened and, 223, 228, are closed at the start of a first time interval between changes of container gas flow connections during which container pressure vessel, 224, is being compressed and container pressure vessel, 225, is being expanded.

(b) During this first time interval, the expander discharge, 230, is first connected to the first product gas collector pipe, 231, by opening the changeable expander discharge gas flow connection, 232, and closing the changeable expander discharge gas flow connection, 234, for a first discharge time period. A second discharge time interval follows next, and still within this first time interval between changes of container gas flow connections, with the expander discharge, 230, next connected to the second product gas collector pipe, 233, by opening the changeable expander discharge gas flow connection, 234, and closing the changeable expander discharge gas flow connection, 232.

(c) At the end of the first time interval between changes of container gas flow connectings, a subsequence of discharge time periods has also been completed with the expander discharge having been connected first to one product gas collector pipe, 231, and then to the other product gas collector pipe, 233.

(d) A second time interval between changes of container gas flow connections next commences, with container changeable gas flow connections, 223, 228, opened and, 222, 229, closed, during which container pressure vessel, 225, is being compressed and container pressure vessel, 224, is being expanded.

(e) During this second time interval, the subsequence of discharge time periods is again repeated as described above in sections (b) and (c).

(f) The cyclic gas separator machine of FIG. 16 can continue to operate in this manner, the containers, 224, 225, exchanging functions during each succeeding time interval between changes of container gas flow connections, each of the product gas collector pipes being supplied with product gas intermittently during each such time interval.

A vapor compression refrigerator was used as an example combined, source of heating fluid, source of cooling fluid, sink for heating fluid and sink for cooling fluid, in the example cyclic gas separator machine of FIGS. 2, 3, 4, 5. Additionally, for this example all those containers being heated were connected in parallel between the heating fluid source and sink and all those containers being cooled were also connected in parallel between the cooling fluid source and sink as is shown in FIG. 3. But series connection of containers can alternatively be used. With such series connections, it may be preferable that cooling fluid first enters that container which has just previously finished expansion and is just starting compression so that this previously heated container is quickly cooled down to improve capture. Also other refrigerator types may be used such as absorption refrigerators.

In cases where the mixed gas contains two or more weakly held molecule types which are to be separated and additionally contains very strongly held molecules which are to be additionally separated and which may be difficult to remove from the surface force material, we may prefer that the several containers undergoing expansion be operated at different temperatures. For this case only moderately high temperatures could be used for those containers first being expanded since it is the weakly held molecules which are then leaving the containers. Only moderate temperatures are needed to achieve escape of these weakly held molecules and use of very high temperatures may aggravate diffusion remixing of previously separated gas portions. For those containers being later and last expanded, very high temperatures can be used to facilitate escape of the strongly held molecules which are then leaving the containers. One example method for achieving such different temperatures during expansion would be to add electric heating means to the several containers of FIG. 3 which are supplied with electric power only when the containers are undergoing final expansion and are connected to the final product gas collector pipe, 56, via the final expander, 54, as shown in FIG. 2. Of course, electric heating means could be used alone as the sole heating means and different temperatures achieved during expansion by use of different power levels supplied to the different containers undergoing expansion. Even combustion gases could be used as heating means where extremely high surface temperatures were needed.

Various particular kinds of elements have been described in the foregoing examples of cyclic char gasifier machines in order to illustrate and describe the invention, but it is not intended to limit the invention to these particular examples or these particular kinds of elements since the invention resides in the described combinations of elements capable of performing particular functions and any elements capable of performing these functions are suitable for use in the combinations of this invention.

C. Plant sizing:

Commonly a cyclic gas separator machine is sized to separate a selected mass of mixed gas per unit time and this mass flow rate of mixed gas to be separated is then the basic plant size. It remains then to determine the compressor sizes, the container pressure vessel sizes and surface area of surface force material, the expanders sizes, the heating and cooling capacities needed if used, for selected operating conditions of the machine in order to separate this mixed gas mass flow rate. In almost all cases, this sizing needs to be based on pilot plant experimental data since, the actual surface force characteristics of surfaces are rarely known in sufficient detail, these surface forces can vary appreciably for apparently similar materials due to effects of preparation or origin, and these surface forces can also be appreciably changed by the presence of minor quantities of certain impurities in the mixed gas. The following outline serves to illustrate a pilot plant sizing method suitable for use with cyclic gas separators such as are shown in FIGS. 2, 3, 4, 5, when separating a mixed gas containing two kinds of molecules, a strongly held molecule and a very weakly held molecule. Essentially similar sizing methods can be readily applied to other cases.

(1) The basic pilot plant size in terms of, mcr, the intended mixed gas input flow rate in mass units per unit time is known and is also the compressor input mass flow rate. Also known or measurable will be the following properties of the mixed gas to be separated:

(a) = mixed gas mol fraction of strongly held molecules;
(b) = mixed gas mol fraction of weakly held molecules;

$(a) + (b) = 1$ (MR) = average mixed gas molecular weight;

(MB)=average molecular weight of weakly held molecules;

(MA)=average molecular weight of strongly held molecules;

(Ru)=Universal perfect gas constant, energy units per unit mol, unit absolute temperature;

(K)=Isentropic exponent of gases;

(CPA)=specific heat at constant pressure of strongly held molecules, energy units per unit mass, degree absolute;

(CPB)=specific heat at constant pressure of weakly held molecules, energy units per unit mass, degree absolute.

A set of operating conditions for the cyclic gas separator pilot plant are selected as follows:

(PO)=mixed gas absolute pressure at inlet to compressor, force units per unit area;

(PM)=maximum absolute pressure inside container pressure vessels at end of compression, force units per unit area;

(TO)=mixed gas absolute temperature at inlet to compressor;

(TSC)=surface absolute temperature inside container pressure vessels during compression;

(TSX)=surface absolute temperature inside container pressure vessels during expansion;

(PMX)=maximum absolute pressure inside container pressure vessels at start of expansion, force units per unit area, approximately equal to, $$(PMX) = (PM)\left(\frac{TSX}{TSC}\right) ;$$

(PX)=absolute pressure at expander discharge, force units per unit area, and can be different for different separate expanders but assumed the same for this particular example illustration.

A particular set of these operating conditions are used for any one group of pilot plant experiments but other sets of operating conditions are used for other experiments in order that the operating conditions most suitable for the intended separation may be found.

Compressor capacity at selected operating conditions necessarily equals selected mixed gas flow rate, (mcr).

A surface force material suitable for the intended mixed gas separation is selected and its surface area, (ar), per unit gross surface material volume, (vs), determined either from the material supplier or experimentally by prior art surface area measurement methods. An additional property of the surface force material in combination with the mixed gas to be separated is the saturation capacity, (H), of unit area of surface force material to capture the strongly held molecules in mols per unit surface area. The saturation capacity, (H), may be approximated from a laboratory experiment wherein a known mass of strongly held molecules is placed inside a pressure vessel containing a known area of surface force material at a known temperature and the resulting pressure measured. The saturation capacity, (H), can then be estimated as follows:

$$(H)(ARL) = \left(\frac{mca}{MA}\right) - \left[\frac{(PL)(VRL)}{(Ru)(TSL)}\right]$$

wherein for this laboratory experiment:

(ARL)=surface area of the surface force material inside the pressure vessel, area units;

(mca)=mass of strongly held molecules placed inside the pressure vessel, mass units;

(MA)=molecular weight of the strongly held molecules;

(PL)=the measured absolute pressure inside the pressure vessel after placing (mca) therein, force units per unit area;

(VRL)=total gas space volume inside the pressure vessel, volume units;

(TSL)=absolute temperature inside the pressure vessel.

A number of pilot plant container pressure vessels are made up equal to the sum of the number of compressor stages, (nc), plus the number of expander stages, (nx). Each of these container pressure vessels has a total interior volume, (VT), which is then filled in whole or part with the surface force material whose total surface area in each container is (AR). The remaining gas space volume per container, (VR), is then calculated as follows:

$$(VR) = (VT) - \frac{(AR)(vs)}{(ar)} [1 - (pf)]$$

wherein (pf) is the pore volume fraction of the gross volume of the surface force material.

When a cyclic gas separator is operating, the strongly held molecules in the mixed gas first to enter a container pressure vessel are captured by the first portions of surface force material and these first portions are soon essentially saturated as more of these molecules pass over them. Hence, strongly held molecules entering the container later during compression move farther along the surface before being captured thereon. Accordingly for each pressure, (P), of compression, a certain fraction, (y), of the surface area, (AR), is very nearly saturated with strongly held molecules. This saturated portion of the surface area, (y)(AR), is positioned toward the inlet end of the container pressure vessel. Saturated area fraction, (y), at each compression pressure, (P), may be estimated from the following approximate relation:

$$\frac{(y)}{[1-(y)]} = \frac{(P)}{(Ru)(TSC)} \quad \frac{(VR)}{(AR)} \quad \frac{(a)}{(b)} \quad \frac{1}{(H)}$$

Maximum saturated area fraction, (yM), occurs at maximum compression pressure, (PM), when compression finishes. That mixed gas last to enter the container pressure vessel will not undergo separation since it will find itself adjacent only to surface force material already saturated by the mixed gas earlier compressed into the pressure vessel. During expansion, however, this last to enter mixed gas will then flow over those surface area portions, [1−(yM)](AR), not previously saturated and will then undergo the desired separating action resulting from surface force capture combined with cross flow. So that all of the mixed gas compressed into each container will undergo this separating action, we prefer to terminate compression when at least sufficient unsaturated area, [1−(yM)](AR), remains to subsequently capture all of the as yet uncaptured strongly held molecules of the mixed gas during expansion. This preferred maximum saturated area fraction, (yMP), and the preferred maximum compression pressure, (PMP), at which it will be obtained can be estimated from the following approximate relations:

$$(yMP) = \left[\frac{1 - \sqrt{(b)}}{(a)}\right]$$

$$(PMP) = \frac{(\sqrt{b})(Ru)(TSC)(AR)(H)}{(a)(VR)}$$

Of course, it is not necessary to always operate a cyclic gas separator at this preferred maximum compression pressure. At lower values of maximum compression pressure, all of the mixed gas will experience separating action but the machine capacity per cycle is reduced. At higher values of maximum compression pressure, some mixed gas may escape the separator action and the purity of the separated product gases wil be adversely affected.

As expansion proceeds, the weakly held molecules leave the container pressure vessel first, being first positioned at the outlet end, and subsequently the strongly held molecules leave the container pressure vessel. At the end of expansion the molecules remaining inside the pressure vessel are largely of the strongly held type and some fraction, (go), of these remain captured on the surface when compression again commences. Hence, at the start of compression the surface of the surface active material is not completely free of capturable molecules but on the other hand, none of the area is saturated. This captured gas fraction, (go), remaining at the start of compression is best determined from the pilot plant data as described hereinafter.

The time interval between changes of container gas flow connections, tcc, can be estimated from the following approximate relation:

$$(mcr)(tcc) = \qquad \text{Eqn. A}$$

$$\frac{(PO)(VR)}{(Ru)(TSX)} \left\{ \frac{(PM)}{(PO)} \frac{(TSX)}{(TSC)} \left[ \frac{[1-(yM)]}{(b)} (MR) + (yM)(MR) \right] - (MA) - (go)(MA) \right\}$$

This relation assumes that the gas at the end of compression in those gas spaces over unsaturated portions of the surface of surface active material are essentially fully depleted of strongly held molecules. This eqn. A relation can also be used for preliminary sizing of the pilot plant container pressure vessels using estimated values for (go). We prefer short values of time interval, (tcc), in order to suppress diffusional remixing of previously separated gases. But we prefer long values of time interval, (tcc), in order to remove the previously captured molecules as fully as possible and achieve a low value of (go). Hence, a compromise must be struck between these conflicting aims. The time interval, (tcc), can be increased by increase of container pressure vessel gas space volume, (VR). This eqn. A relation can also be applied to measured pilot plant data to calculate actual values of, (go).

The cycle time, (tc), required for one container to through a complete sequence of connections to each compressor stage outlet and then to each expander stage inlet then becomes:

$$(tc) = [(nc) + (nx)](tcc)$$

As expansion proceeds from any one container pressure vessel, the pressure is reached at which the composition of the gas leaving the pressure vessel changes from predominantly weakly held molecules to predominantly strongly held molecules. At this change pressure, (PC), the container pressure vessel outlet is to change gas flow connections from the first expander, discharging into the first product gas collector pipe, to the second expander discharging into the second product gas collector pipe. Alternatively, where a single expander is used with changeable expander discharge connections, these latter are to similarly change connections at this change pressure. The change pressure, (PC), is best determined experimentally. When the preferred maximum compression pressure, (PMP), is used the change pressure can be estimated from the following approximate relation:

$$(PC) = (yMP)(PMP)\frac{(TSX)}{(TSC)} = (yMP)(PMX)$$

The combined mass flow rate capacity of all expanders together is to be at least equal to the compressor mass flow rate, (mcr). As between separate expanders, the mass flow rates are to be distributed in proportion to the mass flow rates of the separate product gases produced. Thus, for the particular case being illustrated with two separate expanders producing two separate product gases, a weakly held product gas, and a strongly held product gas, the expander flow rate capacities are to be at least equal to the following values:

(mxrb)=mass flow rate capacity of first expander producing weakly held product gas, mass units per time unit;

$$(mxrb) = (mcr)\left[\frac{(b)(MB)}{(a)(MA) + (b)(MB)}\right]$$

(mxra)=mass flow rate capacity of second expander producing strongly held product gas, mass units per time unit;

$$(mxra) = (mcr)\left[\frac{(a)(MA)}{(a)(MA) + (b)(MB)}\right]$$

When containers are to be cooled during compression and heated during expansion, as shown for example in the cyclic gas separator of FIGS. 2, 3, 4, 5, the required minimum cooling capacity, (QCT), per time interval, (tcc), and the required minimum heating capacity, (QHT), per time interval, (tcc), can be estimated from the following approximate relations:

$$(QCT) = (wm)(cpm)[(TSX) - (TSC)] + (mcr)(tcc)(CP-R)[(TO) - (TSC)] + (wcr)(tcc)$$

wherein:

(QCT)=minimum required cooling capacity in energy units per time interval, (tcc);

(wm)=mass of one container including pressure vessel, jacket, surface force material, etc.;

(CPM)=average specific heat of container mass, energy units per unit mass, degree absolute;

(CPR) = specific heat at constant pressure of mixed gas to be separated, energy units per unit mass, degree absolute;
(wcr) = compressor work input rate, energy units per time unit;

$$(QHT) = (wm)(cpm)[(TSX) - (TSC)] + (mcr)(tcc)(CPR)[(TSX) - (TSC)] + (mcr)(tcc)\left(\frac{Ru}{MR}\right)(TSX)$$

wherein (QHT) = minimum required heating capacity in energy units per time interval, (tcc).

Of the several separate quantities making up these total cooling, (QCT), and heating, (QHT), capacity requirements by far the largest is the energy for cooling and then reheating the mass of the container itself, (wm)(cpm)[(TSX)−(TSC)], the gas cooling and heating and work quantities being almost invariably much smaller. Hence, any small errors in estimating compressor work input rate, (wrc), will not result in serious error in sizing the cooling means. Preferably some excess of cooling capacity and heating capacity is provided over these calculated minimum required capacities to allow for heat transfer to and from the surroundings. A refrigerator cooling and heating means, for example, can readily be sized to provide the required cooling and heating capacities by methods already well known in the art of refrigeration and heat pumps.

During pilot plant experiments, the following additional items are preferably also measured:

(wcr) = compressor work input rate, energy units per unit time;
(eisc) = fractional isentropic compressor efficiency;
(wxr) = work output rate of all expanders combined, energy units per unit time;
(eisx) = fractional isentropic expander efficiency.

Alternatively, the separate work output rates and isentropic efficiencies of the separate expanders can be individually measured.

(mxar) = mass flow rate of strongly held product gas, mass per unit time;
(mxbr) = mass flow rate of weakly held product gas, mass per unit time.

Preferably, the compressor and expander work quantities are corrected to the higher efficiencies common to larger machines when scaling up from the pilot plant size to the full scale plant size.

Pilot plant data from a wide range of operating conditions can be plotted in the following graphs for convenience in interpolating between data points and to a limited extent for extrapolation beyond the data:

(A) Plot the quantity, $$\frac{(mcr)(tcc)}{(VR)},$$

against the quantity, [(PM)−(PO)], at various values of the quantity, $$\frac{(MR)}{(Ru)(TSC)};$$

(B) Plot the quantity, $$\frac{(wcr)(tcc)}{(VR)},$$

against the quantity $$\left[\frac{(PM)^{\frac{2k-1}{k}} - (PO)^{\frac{2k-1}{k}}}{(PO)^{\frac{k-1}{k}}}\right],$$

at various values of the quantity, $$\frac{(To)(k)}{(eisc)(TSC)(k-1)};$$

(C) Plot the quantity, $$\frac{(mxar)(tcc)}{(VR)},$$

against the quantity, [(PC)−(PX)], at various values of the quantity, $$\frac{(MA)}{(Ru)(TSX)};$$

(D) Plot the quantity, $$\frac{(mxbr)(tcc)}{(VR)},$$

against the quantity, [(PMX)−(PC)], at various values of the quantity, $$\frac{(MB)}{(Ru)(TSX)};$$

(E) Plot the quantity, $$\frac{(wxr)(tcc)}{(VR)},$$

against the quantity, [(PMX)−(PX)], at various values of the quantity, $$\frac{(MR)(CPR)(eisx)}{(Ru)};$$

Any consistent system of units can be used for the foregoing measured and calculated quantities.

D. Product Gas Purity:

The purity of the two or more product gases formed by the separation of the original mixed gas varies with many factors of which the following are among the more important:

(1) As maximum pressure of compression, (PM), increases, product purity decreases due to a slowing down of the cross flow.

(2) As container pressure vessel length increases relative to cross sectional flow area, product purity increases due to a speeding up of the cross flow.

(3) As the ratio of surface area, (AR), to gas space volume, (VR), increases, product purity increases due to increased capture of molecules.

(4) As the time interval between changes of gas flow connections, tcc, increases, product purity decreases due to increased diffusional remixing.

(5) As the change pressure, (PC), at which a container connection is changed from a first product gas expander to a second product gas expander (or a second expander to a third expander, etc.) is increased, the product purity of the first gas is improved while that of the second gas is worsened.

These effects on product gas purity of the change pressure used can be most conveniently illustrated with the particular example of a mixed gas containing only two molecule types, a strongly-held type a molecule, and a weakly-held type b molecule, which is to be separated into two product gases, a weakly-held product gas and a strongly-held product gas. As one particular container pressure vessel undergoes expansion, the first gas to leave the outlet will be almost pure type b weakly-held molecules since this gas has travelled during compression the full length of the pressure vessel surface and the surface forces have captured therefrom almost all type a strongly-held molecules since during this passage none of the surface was saturated. The type b purity of the emerging first product gases decreases slowly as container pressure decreases during expansion since later emerging gases have experienced somewhat less separating action, having traveled during compression over only part of the pressure vessel surface and some portions of this surface had become previously partially saturated. Finally, a middle gas will emerge from the pressure vessel outlet which during compression experienced almost no separating action since these gases then traveled only over surface already essentially saturated with strongly held molecules. This middle gas experiences separating action only after expansion commences and the middle gas then passes over surface areas not previously saturated with type a molecules. Later emerging portions of the middle gas pass over lesser unsaturated surface area and are less well separated and, as a result, the type b purity of the then emerging gases decreases sharply. The last portion of this middle gas would be essentially of original mixed gas composition when the preferred values of, (yMP), and (PMP) are used, were it not for the escape of type a molecules from earlier surface capture as the pressure has decreased. Thus, when the last portion of middle gas emerges, it is richer in type a strongly-held molecules than the original mixed gas. Thereafter, during expansion the type a purity of the emerging gas increases as more previously captured type a molecules escape from the surface, the major portion of type b molecules having already been removed from the pressure vessel by the time all the middle gas has emerged from the outlet. Hence, the last gas to emerge from the container pressure vessel will be almost pure type a strongly-held molecules.

Consider now a cyclic gas separator machine using only two separate expanders connected separately to two product gas collector pipes. As change pressure is decreased below maximum container pressure at expansion start, (PMX), the type b purity of the first product gas decreases and the type a purity of the second product gas increases. Hence, with this machine we can produce either a high type b purity in the weakly-held product gas or a high type a purity in the strongly-held product gas but not both results. This type of machine would be useful where only one of the product gases was needed and at high purity and the other product gas was a waste material. This type of machine would also be useful where both of the product gases were needed but not at high purity, the change pressure then being selected so that connections are changed at some time during the emergence of the middle gas. For the preferred case using preferred values, (yMP), and (PMP), this change pressure, (PC), is approximately as follows:

$$(PC) = (yMP)(PMP)\frac{(TSX)}{(TSC)}$$

Where it is desired to separate the mixed gas into two product gases and both are to be of high purity, a cyclic gas separator machine using three separate expanders connected to three separate product gas collector pipes can be used with two different change pressures. The first change pressure is set slightly prior to or after the middle gas starts emerging from the container pressure vessel outlet. The second change pressure is set slightly prior to or after the middle gas finishes emerging from the container pressure vessel outlet. In this way, three product gases are separated from the mixed gas: a first weakly-held product gas of high type b purity; a middle product gas containing both weakly and strongly-held molecules; a final strongly-held product gas of high type a purity. The values of these two change pressures are best determined experimentally to achieve the desired purities of the first product gas and the final product gas. The middle product gas can be recycled back through the cyclic gas separator. Similar methods can also be applied for cases where a mixed gas is to be separated into three or more product gases.

In no practical case can any product gas be separated with perfect purity since at least some diffusional remixing is inevitable.

Having thus described my invention, what I claim is:

1. A cyclic gas separator machine for separating mixed gases and comprising:
    at least one compressor means for compressing gases from a lower pressure to a higher pressure and each such compressor means comprising at least one stage and each such stage comprising an inlet and an outlet end;
    at least two separate expander means for expanding gas from a higher pressure to a lower pressure and each such expander means comprising at least one stage and each such stage comprising an inlet end and a discharge end;
    at least three separate container means, each of said containers comprising, an elongated gas pressure vessel means for containing any gas compressed therein, an inlet at one end of said pressure vessel, an outlet at the other end of said pressure vessel, at least one type of surface force material, means for positioning said surface force material inside said gas pressure vessel means so that gas can flow through said pressure vessel means from said inlet to said outlet and so that when gas flows into said pressure vessel inlet and also when gas flows out of said pressure vessel outlet, such gas flow occurs essentially unidirectionally across most of the surface of said surface force material;
    power means for driving each said compressor means and for absorbing any mechanical work done upon each said expander means by said expanding gas;
    each such expander means comprising an expander discharge;

at least one mixed gas supply source of gas to be separated;

a number of separate product gas collector pipes equal to said number of separate expander means;

each such compressor means whose number of stages exceeds one further comprising fixed open gas flow connections from the outlet end of each compressor stage, except one, to the inlet end of one other stage of said compressor, whereby said stages of said compressor are connected in series so that the pressure of a particular gas mass, at delivery from each stage, increases as said gas mass is compressed through said series connected stages, from the inlet end to the outlet end of each stage, with the first stage in said series through which a gas mass first flows being both the lowest pressure stage and also that one stage whose inlet end does not have a fixed open gas flow connection from the outlet end of any other stage of said compressor, and with the last stage in said series through which a gas mass last flows being both the highest pressure stage and also that one stage whose outlet end does not have fixed open gas flow connection to the supply end of any other stage of said compressor;

fixed open gas flow connections from the inlet end of the lowest pressure stage of each of said compressor means to said mixed gas supply source;

each such separate expander means whose number of stages exceeds one further comprising fixed open gas flow connections from the discharge end of each expander stage, except one, to the inlet end of one other stage of said expander, whereby said stages of said expander are connected in series so that the pressure of a particular gas mass, at discharge from each stage, decreases as said gas mass is expanded through said series connected stages, from the inlet end to the discharge end of each stage, with the first stage in said series through which a gas mass first flows being both the highest pressure stage and also that one stage whose inlet end does not have a fixed open gas flow connection from the discharge end of any other stage of said expander, and with the last stage in said series through which a gas mass last flows being both the lowest pressure stage and also that one stage whose discharge end does not have a fixed open gas flow connection to the inlet end of any other stage of said expander;

fixed open gas flow connections from the discharge end of the lowest pressure stage of each of said expander means to said expander discharge;

expander discharge means for connecting the discharge of each of said separate expander means separately to but one of said product gas collector pipes with a fixed open gas flow connection so that each product gas collector pipe is thusly connected to but one of said separate expander discharges;

changeable container gas flow connections, which are openable and closeable, from the gas pressure vessel inlet of each of said containers to each outlet end of each stage of each of said compressor means, and from the gas pressure vessel outlet of each of said containers to each inlet end of each stage of each of said expander means;

each cyclic gas separator machine comprising a number of said containers, with changeable gas flow connections to said compressor means and to said expander means, at least equal to the sum of the number of compressor stages of all compressors and the number of expander stages of all expanders;

means for opening and closing said changeable gas pressure vessel gas flow connections so that each gas pressure vessel inlet is opened for a time period to each outlet end of each stage of each of said compressor means, in a sub-sequence of time periods of open gas flow connections to compressors, said sub-sequence proceeding in time order of increasing compressor stage delivery pressure, each gas pressure vessel outlet is opened for a time period to each inlet end of each stage of each of said expander means, in a sub-sequence of time periods of open gas flow connections to expanders, said sub-sequence proceeding in time order of decreasing expander stage inlet pressure, said sub-sequence of connections to said compressors being followed by said sub-sequence of connections to said expanders, and these together comprise one sequence of time periods of open gas flow connections, each of said gas pressure vessel changeable gas flow connections is opened to only one stage during any one time period of said sequence of time periods, said sequence of time periods of open gas flow connections to said compressor means and to said expander means is repeated for each of said containers by said means for opening and closing;

means for controlling said means for opening and closing said changeable gas pressure vessel gas flow connections, so that said repeated sequences of time periods of open gas flow connections are a continuous series of time periods for any one containing means, and so that the delivery end of each stage of each compressor means has an open gas flow connection to one gas pressure vessel inlet, and the inlet end of each stage of each expander means has an open gas flow connection to one gas pressure vessel outlet, during all time periods, whenever said machine is operating.

2. A cyclic gas separator machine for separating mixed gases as described in claim 1:

wherein each of said container means further comprises a heating and cooling jacket surrounding said gas pressure vessel means, said jacket having a fluid inlet and a fluid outlet;

and further comprising;

a source of cooling fluid;

a sink for cooling fluid;

a source of heating fluid;

a sink for heating fluid;

changeable heating and cooling connections which are openable and closeable from the inlet of each heating and cooling jacket to said source of cooling fluid, and from the inlet of each heating and cooling jacket to said source of heating fluid, and from the outlet of each heating and cooling jacket to said sink for cooling fluid, and from the outlet of each heating and cooling jacket to said sink for heating fluid;

cooling and heating means for opening and closing said changeable heating and cooling connections so that: each heating and cooling jacket inlet is opened to said source of cooling fluid and closed to said source of heating fluid and said outlet of said same heating and cooling jacket is concurrently opened to said sink for cooling fluid and closed to said sink for heating fluid during a sub-sequence of cooling time periods; each heating and cooling jacket inlet is opened to said source of heating fluid and closed to said source of cooling fluid and said outlet of said same heating and cooling jacket is concurrently opened to said sink for heating fluid and closed to said sink for cooling fluid during a sub-sequence of heating time periods; said sub-sequence of cooling time periods for each container occurring concurrently with said sub-sequence of gas flow connections to compressor means; said sub-sequence of heating time period for each container occurring concurrently with said sub-sequence of gas flow connections to expander means.

3. A cyclic gas separator machine for separating mixed gases as described in claim 2, and further comprising:
cooling control means for controlling the temperature of said cooling fluid from said source of cooling fluid;
heating control means for controlling the temperature of said heating fluid from said source of heating fluid.

4. A cyclic gas separator machine for separating mixed gases and comprising:
at least one compressor means for compressing gases from a lower pressure to a higher pressure and each such compressor means comprising at least one stage and each such stage comprising an inlet and an outlet end;
at least one expander means for expanding gas from a higher pressure to lower pressure and each such expander means comprising at least one stage and each such stage comprising an inlet end and a discharge end;
at least two separate container means, each of said containers comprising an elongated gas pressure vessel means for containing any gas compressed therein, an inlet at one end of said pressure vessel, an outlet at the other end of said pressure vessel, at least one type of surface force material, means for positioning said surface force material inside said gas pressure vessel means so that gas can flow through said pressure vessel means from said inlet to said outlet and so that when gas flows into said pressure vessel inlet and also when gas flows out of said pressure vessel outlet such gas flow occurs essentially unidirectionally across most of the surface of said surface force material;
power means for driving each said compressor means and for absorbing any mechanical work done upon each said expander means by said expanding gas;
each such expander means comprising an expander discharge;
at least one mixed gas supply source of gas to be separated;
each such compressor means whose number of stages exceeds one further comprising fixed open gas flow connections from the outlet end of each compressor stage, except one, to the inlet end of one other stage of said compressor, whereby said stages of said compressor are connected in series so that the pressure of a particular gas mass, at delivery from each stage, increases as said gas mass is compressed through said series connected stages, from the inlet end to the outlet end of each stage, with the first stage in said series through which a gas mass first flows being both the lowest pressure stage and also that one stage whose inlet end does not have a fixed open gas flow connection from the outlet end of any other stage of said compressor, and with the last stage in said series through which a gas mass last flows being both the highest pressure stage and also that one stage whose outlet end does not have a fixed open gas flow connection to the supply end of any other stage of said compressor;
fixed open gas flow connections from the inlet end of the lowest pressure stage of each of said compressor means to said mixed gas supply source;
each such separate expander means whose number of stages exceeds one further comprising fixed open gas flow connections from the discharge end of each expander stage, except one, to the inlet end of one other stage of said expander, whereby said stages of said expander are connected in series so that the pressure of a particular gas mass, at discharge from each stage, decreases as said gas mass is expanded through said series connected stages, from the inlet end to the discharge end of each stage, with the first stage in said series through which a gas mass first flows being both the highest pressure stage and also that one stage whose inlet end does not have a fixed open gas flow connection from the discharge end of any other stage of said expander, and with the last stage in said series through which a gas mass last flows being both the lowest pressure stage and also that one stage whose discharge end does not have a fixed open gas flow connection to the inlet end of any other stage of said expander;
fixed open gas flow connections from the discharge end of the lowest pressure stage of each of said expander means to said expander discharge;
at least two separate product gas collector pipes;
changeable expander discharge gas flow connections which are openable and closeable separately from the discharge of at least one of said expander means to at least two of said separate product gas collector pipes;
said number of separate product gas collector pipes being equal to said number of separate expander means plus said number of changeable expander discharge gas flow connections less the number of said separate expander means having changeable expander discharge gas flow connections;
changeable container gas flow connections, which are openable and closeable, from the gas pressure vessel inlet of each of said containers to each outlet end of each stage of each of said compressor means, and from the gas pressure vessel outlet of each of said containers to each inlet end of each stage of each of said expander means;
each cyclic gas separator machine comprising a number of said containers, with changeable gas flow connections to said compressor means and to said expander means, at least equal to the sum of the number of compressor stages of all compressors and the number of expander stages of all expanders;
means for opening and closing said changeable gas pressure vessel gas flow connections so that each gas pressure vessel inlet is opened for a time period to each outlet end of each stage of each of said compressor means, in a sub-sequence of time periods of open gas flow connections to compressors, said sub-sequence proceeding in time order of increasing compressor stage delivery pressure, and each gas pressure vessel outlet is opened for a time period to each inlet end of each stage of each of said expander means, in a sub-sequence of time periods of open gas flow connections to expanders, said sub-sequence proceeding in time order of decreasing expander stage inlet pressure, said sub-sequence of connections to said compressors being followed by said sub-sequence of connections to said expanders, and these together comprise one sequence of time periods of open gas flow connections, each of said gas pressure vessel changeable gas flow connections is opened to only one stage during any one time period of said sequence of time periods, said sequence of time periods of open gas flow connections to said compressor means and to said expander means is repeated for each of said containers by said means for opening and closing means for controlling said means for opening and closing said changeable gas pressure vessel gas flow connections, so that said repeated sequences of time periods of open gas flow connections are a continuous series of time periods for any one containing means, and so that the delivery end of each stage of each compressor means has an open gas flow connection to one gas pressure vessel inlet, and the inlet end of each stage of each expander means has an open gas flow connection to one gas pressure vessel outlet, during all time periods, whenever said plant is operating;

expander discharge means for opening and closing said changeable expander discharge gas flow connections so that: each separate expander means having changeable expander discharge gas flow connections always has one and only one of said changeable connections open at any one time whenever said machine is operating; each changeable expander discharge gas flow connection is opened for a discharge time period in a sub-sequence of discharge time period; the duration of said sub-sequence of discharge time periods equalling the duration of the time period between changes of gas flow connections; said sub-sequence of discharge time period is repeated for each separate expander means having changeable expander discharge gas flow connections during each time period between changes of gas flow connections.

5. A cyclic gas separator machine for separating mixed gases as described in claim 2:
wherein each of said container means further comprises a heating and cooling jacket surrounding said gas pressure vessel means, said jacket having a fluid inlet and a fluid outlet;
and further comprising:
a source of cooling fluid;
a sink for cooling fluid;
a source of heating fluid;
a sink for heating fluid;
changeable heating and cooling connections which are openable and closeable from the inlet of each heating and cooling jacket to said source of cooling fluid, and from the inlet of each heating and cooling jacket to said source of heating fluid, and from the outlet of each heating and cooling jacket to said sink for cooling fluid, and from the outlet of each heating and cooling jacket to said sink for heating fluid;
cooling and heating means for opening and closing said changeable heating and cooling connections so that: each heating and cooling jacket inlet is opened to said source of cooling fluid and closed to said source of heating fluid and said outlet of said same heating and cooling jacket is concurrently opened to said sink for cooling fluid and closed to said sink for heating fluid during a sub-sequence of cooling time periods; each heating and cooling jacket inlet is opened to said source of heating fluid and closed to said source of cooling fluid and said outlet of said same heating and cooling jacket is concurrently opened to said sink for heating fluid and closed to said sink for cooling fluid during a sub-sequence of heating time periods; said sub-sequence of cooling time periods for each container occurring concurrently with said sub-sequence of gas flow connections to compressor means; said sub-sequence of heating time periods for each container occurring concurrently with said sub-sequence of gas flow connections to expander means.

6. A cyclic gas separator machine for separating mixed gases as described in claim 5, and further comprising:
cooling control means for controlling the temperature of said cooling fluid from said source of cooling fluid;
heating control means for controlling the temperature of said heating fluid from said source of heating fluid.

7. A cyclic gas separator machine for separating mixed gases as described in claim 1, 4, 2, or 5;
wherein said means for controlling said means for opening and closing said changeable gas pressure vessel gas flow connections further comprises time interval adjustment means for adjusting the time interval between changes of container gas flow connections.

8. A cyclic gas separator machine for separating mixed gases as described in claim 1, 4, 2, or 5, and further comprising:
a vacuum pump comprising means for pumping each of said pressure vessel means down to a pressure below the pressure at which the gases therefrom are discharged into said connected product gas collector pipe, said pumping means having at least one stage and each such stage comprising an inlet end and a discharge end;
each such vacuum pump whose number of stages exceeds one further comprising fixed open gas flow connections from the discharge end of each vacuum pump stage, except one, to the inlet end of one other stage of said vacuum pump, whereby said stages of said vacuum pump are connected in series so that the pressure of a particular gas mass, at delivery from each stage, increases as said gas mass is pumped through said series connected stages, from the inlet end to the discharge end of each stage, with the first stage in said series through which a gas mass first flows being both the lowest pressure stage and also that one stage whose inlet end does not have a fixed open gas flow connection from the discharge end of any other stage of said vacuum pump, and with the last stage in said series through which a gas mass last flows being both the highest pressure stage and also the one stage whose discharge end does not have a fixed open gas flow connection to the inlet end of any other stage of said vacuum pump;
a means for driving said vacuum pumping means;

a vacuum expander comprising means for expanding mixed gases from the supply source pressure of said gases down to the pressure within said pressure vessel means, said expanding means having at least one stage and each such stage comprising a supply end and a delivery end;

each such vacuum expander whose number of stages exceeds one further comprising fixed open gas flow connections from the delivery end of each expander stage, except one, to the supply end of one other stage of said expander, whereby said stages of said expander are connected in series so that the pressure of a particular gas mass, at discharge from each stage, decreases as said gas mass is expanded through said series connected stages, from the supply end to the delivery end of each stage, with the first stage in said series through which a gas mass first flows being both the highest pressure stage and also that one stage whose supply end does not have a fixed open gas flow connection from the delivery end of any other stage of said expander, and with the last stage in said series through which a gas mass last flows being both the lowest pressure stage and also that one stage whose delivery end does not have a fixed open gas flow connection to the supply end of any other stage of said expander; and further fixed open gas flow connections from the discharge end of the highest pressure stage of said vacuum pump to one product gas collector pipe, the supply end of the lowest pressure stage of said vacuum expander to said mixed gas supply source; and further changeable gas flow connections, which are openable and closeable, from the pressure vessel inlet of each of said containers to the delivery end of each stage of said vacuum expander and from the pressure vessel outlet of each of said containers to the inlet end of each stage of said vacuum pump;

wherein each cyclic gas separator machine comprises a number of said containing means, with changeable gas flow connections to said compressor means and to said expander means and to said vacuum pump and to said vacuum expander, at least equal to the sum of the number of compressor stages and the number of expander stages and the number of vacuum pump stages and the number of vacuum expander stages; and further wherein said means for opening and closing said changeable gas pressure vessel gas flow connections also functions so that said sequences of time periods of open gas flow connections further comprises a sub-sequence of open gas flow connections from said pressure vessel outlet to the inlet end of each stage of said vacuum pump, and next thereafter from said pressure vessel inlet to the delivery end of each stage of said vacuum expander, said sub-sequence of open gas flow connections to said vacuum pump and to said vacuum expander following next after said sub-sequence of connections to said expander means; and further wherein said means for controlling said means for opening and closing said changeable gas pressure vessel gas flow connections also functions so that the delivery end of each stage of said vacuum expander has an open gas flow connection to the pressure vessel inlet of at least one containing means, and the inlet end of each stage of said vacuum pump has an open gas flow connection to the pressure vessel outlet of at least one containing means during all time periods, whenever said machine is operating; and further wherein said cooling and heating means for opening and closing said changeable heating and cooling connections also increases said sub-sequence of heating periods for each container to occur also concurrently with any time periods when said container is gas flow connected to said vacuum pump, and also increases said sub-sequence of cooling periods for each container to occur also concurrently with any time periods when said container is gas flow connected to said vacuum expander.

9. A cyclic gas separator machine for separating mixed gases as described in claim 1, 4, 2, or 5, wherein at least one of said expander means is an expander engine.

10. A cyclic gas separator machine for separating mixed gases as described in claim 1, 4, 2, or 5, and further comprising:
density setting means for setting the density of said mixed gas to be separated at said mixed gas supply source.

11. A cyclic gas separator machine for separating mixed gases as described in claim 1, 4, 2, or 5, wherein at least one of said expander means further comprises expander gas flow rate adjustment means for adjusting the gas flow rate through said expander.

12. A cyclic gas separator machine for separating mixed gas as described in claim 1, or 4, and further comprising:
means for cooling said container pressure vessels whenever said container pressure vessel inlets are connected to compressor stages;
means for heating said container pressure vessels whenever said container pressure vessel outlets are connected to expander stages.

* * * * *